(12) United States Patent
Chan

(10) Patent No.: US 11,358,719 B2
(45) Date of Patent: Jun. 14, 2022

(54) ASYMMETRIC AERIAL VEHICLE

(71) Applicant: ST ENGINEERING AEROSPACE LTD., Singapore (SG)

(72) Inventor: Keen Ian Chan, Paya Lebar (SG)

(73) Assignee: ST ENGINEERING AEROSPACE LTD., Paya Lebar (SG)

( * ) Notice: Subject to any disclaimer, the term of this patent is extended or adjusted under 35 U.S.C. 154(b) by 233 days.

(21) Appl. No.: 16/632,233

(22) PCT Filed: Jul. 18, 2017

(86) PCT No.: PCT/SG2017/050356
§ 371 (c)(1),
(2) Date: Jan. 17, 2020

(87) PCT Pub. No.: WO2019/017833
PCT Pub. Date: Jan. 24, 2019

(65) Prior Publication Data
US 2020/0172243 A1 Jun. 4, 2020

(51) Int. Cl.
*B64C 39/08* (2006.01)
*B64C 11/46* (2006.01)
(Continued)

(52) U.S. Cl.
CPC .............. *B64C 39/08* (2013.01); *B64C 11/46* (2013.01); *B64C 27/50* (2013.01); *B64C 27/80* (2013.01);
(Continued)

(58) Field of Classification Search
CPC .......... B64C 39/08; B64C 29/02; B64C 11/46
See application file for complete search history.

(56) References Cited

U.S. PATENT DOCUMENTS

2005/0178879 A1  8/2005  Mao
2013/0092799 A1  4/2013  Tian et al.
(Continued)

FOREIGN PATENT DOCUMENTS

CN  204642150 U  9/2015
CN  106 218 887 A  12/2016
(Continued)

OTHER PUBLICATIONS

Supplemental European Search Report dated Jan. 28, 2021 for corresponding European Application No. 17 743 411.5 (3 pages).
(Continued)

*Primary Examiner* — Nicholas McFall
*Assistant Examiner* — Terri L Filosi
(74) *Attorney, Agent, or Firm* — Lewis Roca Rothgerber Christie LLP

(57) ABSTRACT

An aerial vehicle including a first wing structure and a second wing structure which intersects the first wing structure perpendicularly at a position offset from a midpoint of a transverse axis of the first wing structure in a direction towards a first wingtip of the first wing structure. The aerial vehicle may further include a first set of at least two propellers with respective propeller rotational axes disposed side-by-side along a portion of the first wing structure extending between the midpoint of the transverse axis of the first wing structure and a second wingtip of the first wing structure. The aerial vehicle may further include a second set of at least two propellers with respective propeller rotational axes disposed side-by-side along a first portion of the second wing structure extending from a first surface of the first wing structure. The aerial vehicle may further include a third set of at least two propellers with respective propeller rotational axes disposed side-by-side along a second portion of the
(Continued)

second wing structure extending from a second surface of the first wing structure.

18 Claims, 9 Drawing Sheets

(51) Int. Cl.
  *B64C 29/02* (2006.01)
  *B64C 27/50* (2006.01)
  *B64C 27/80* (2006.01)
  *B64C 39/10* (2006.01)

(52) U.S. Cl.
  CPC .............. *B64C 29/02* (2013.01); *B64C 39/10* (2013.01); *B64C 2201/028* (2013.01); *B64C 2201/108* (2013.01)

(56) References Cited

U.S. PATENT DOCUMENTS

| | | |
|---|---|---|
| 2013/0105635 A1 | 5/2013 | Alzu'bi et al. |
| 2015/0012154 A1* | 1/2015 | Senkel .................... B64C 27/20 701/4 |
| 2015/0014475 A1 | 1/2015 | Taylor et al. |
| 2015/0274286 A1 | 10/2015 | Kereth |
| 2015/0284079 A1 | 10/2015 | Matsuda |
| 2016/0023753 A1 | 1/2016 | Alber |
| 2016/0023755 A1 | 1/2016 | Elshafei et al. |
| 2016/0059958 A1* | 3/2016 | Kvitnevskiy ........... B64C 27/08 701/3 |
| 2016/0244158 A1 | 8/2016 | Fredericks et al. |
| 2016/0272313 A1 | 9/2016 | Chan |
| 2017/0158327 A1 | 6/2017 | Willford |
| 2018/0002015 A1* | 1/2018 | McCullough ............ B64D 1/08 |
| 2018/0215462 A1* | 8/2018 | Fenny .................... B64C 29/02 |

FOREIGN PATENT DOCUMENTS

| | | |
|---|---|---|
| WO | WO2013/048339 A1 | 4/2013 |
| WO | WO2015/099603 A1 | 7/2015 |
| WO | WO 2016/013933 A1 | 1/2016 |

OTHER PUBLICATIONS

Bogdanowicz et al., "Development of a Quad-Rotor Biplane MAV with Enhanced Roll Control Authority in Fixed Wing Mode," Presented at the AHS 71st Annual Forum, Virginia Beach, Virginia, May 5-7, 2015.

* cited by examiner

ASYMMETRIC AERIAL VEHICLE

CROSS-REFERENCE TO RELATED APPLICATION(S)

This application is a U.S. National Phase Patent Application and claims priority to and the benefit of International Application Number PCT/SG2017/050356, filed on on Jul. 18, 2017, the entire contents of which are incorporated herein by reference.

TECHNICAL FIELD

Embodiments generally relate to an asymmetric aerial vehicle, a method of assembling an asymmetric aerial vehicle and a kit of parts for assembling an asymmetric aerial vehicle.

BACKGROUND

Aerial vehicle capable of Vertical Take-Off and Landing (VTOL), for example tail-sitter aircraft such as XFV-1 of the 1950s, typically uses the same set of flight controls for both vertical and horizontal flight and represents the most direct way of achieving transition flight. However, with the pilot facing upwards during vertical flight, making visual assessments, e.g. during landing, can be difficult.

Further, tail-sitter aircrafts have other technical issues. For example, they tend to be susceptible to toppling, e.g. when landing in a wind. This is due to a high centre of gravity relative to the size of the tail base. To address this issue, landing gears of wide span may be installed or span of the tail base may be enlarged to cover a wider area on the ground. These measures typically add weight and aerodynamic drag which in turn compromise the performance (e.g. cruise endurance) of the aircraft.

Another aerial vehicle capable of VTOL would be aircraft with tilt-wings or tilt-rotors configurations. These aircrafts typically remain horizontal during transition. Thus, these configurations would render the aircraft suitable for carrying passengers. However, aircraft with tilt-wings or tilt-rotors configurations would need separate sets of flight controls for helicopter-mode and airplane-mode flight, resulting in high complexity in their development and implementation.

On the other hand, unmanned aerial vehicle (UAV) or drones do not carry passengers or pilots. Hence passenger- and pilot-related limitations of aircraft capable of VTOL are not applicable to UAVs.

However, there are further issues related to the development of autonomous transition for UAV. A typical transition maneuver typically spans a wide range of airspeeds and angle-of-attack. The presence of variables which cover a wide range of values, when multiplied in combinations with the other variables, can potentially result in massive aerodynamic databases for adequate coverage of the transition envelope. This would incur significant effort and cost to generate by means such as wind tunnel testing, CFD etc., when developing autonomous transition. In addition, highly nonlinear aerodynamic characteristics and changes in stability characteristics over the high angle-of-attack range would need complex, non-linear control strategies and algorithms to be developed, further adding to the complexity of development efforts.

A known quad-rotor unmanned aerial vehicle is disclosed in PCT International Publication number WO2013/048339. The quad-rotor unmanned aerial vehicle described may be capable of Vertical Take-Off and Landing (VTOL) as well as transition between a vertical flight mode (or a helicopter-mode) and a horizontal flight mode (or an airplane-mode). However, an operational limitation of the quad-rotor unmanned aerial vehicle is that in the event of failure of one of the propellers, a total loss of controllability occurs for the respective control axis.

An unmanned aerial vehicle is disclosed in PCT International Publication number WO2015/099603 which is proposed to provide redundancy to address the scenario of propeller failure by having three pairs of coaxial and contra-rotating propellers. However, complex mechanisms are involved for each pair of motors driving each pair of coaxial and contra-rotating propellers. The three pairs of coaxial and contra-rotating propellers configuration disclosed also has an operational limitation in that it has weak control authority in yaw during hovering or helicopter-mode flight, which is also the roll control in the airplane-mode flight. The yaw control during hovering may be weak because yaw control may only use differential torque. The weak control authority in yaw during helicopter-mode (or roll during airplane-mode) tends to deteriorate the controllability of the aircraft, particularly when hovering in a crosswind, which is an important practical operating scenario.

SUMMARY

According to various embodiments, there is provided an aerial vehicle including a first wing structure and a second wing structure which intersects the first wing structure perpendicularly at a position offset from a midpoint of a transverse axis of the first wing structure in a direction towards a first wingtip of the first wing structure. The aerial vehicle may further include a first set of at least two propellers with respective propeller rotational axes disposed side-by-side along a portion of the first wing structure extending between the midpoint of the transverse axis of the first wing structure and a second wingtip of the first wing structure. The aerial vehicle may further include a second set of at least two propellers with respective propeller rotational axes disposed side-by-side along a first portion of the second wing structure extending from a first surface of the first wing structure. The aerial vehicle may further include a third set of at least two propellers with respective propeller rotational axes disposed side-by-side along a second portion of the second wing structure extending from a second surface of the first wing structure.

According to various embodiments, there is provided a method of assembling an aerial vehicle. The method may include providing a first wing structure and providing a second wing structure which intersects the first wing structure perpendicularly at a position offset from a midpoint of the first wing structure towards a first wingtip of the first wing structure. The method may further include providing a first set of at least two propellers with respective propeller rotational axes disposed side-by-side along a portion of the first wing structure extending between a midpoint of the first wing structure and a second wingtip of the first wing structure. The method may further include providing a second set of at least two propellers with respective propeller rotational axes disposed side-by-side along a first portion of the second wing structure extending from a first surface of the first wing structure. The method may further include providing a third set of at least two propellers with respective propeller rotational axes disposed side-by-side along a second portion of the second wing structure extending from a second surface of the first wing structure.

According to various embodiments, there is provided a kit for assembling an aerial vehicle. The kit may include a first wing structure and a second wing structure adapted to intersect the first wing structure perpendicularly at a position offset from a midpoint of the first wing structure towards a first wingtip of the first wing structure. The kit may further include a first set of at least two propellers adapted to be disposed with respective propeller rotational axes side-by-side along a portion of the first wing structure extending between a midpoint of the first wing structure and a second wingtip of the first wing structure. The kit may further include a second set of at least two propellers adapted to be disposed with respective propeller rotational axes side-by-side along a first portion of the second wing structure extending from a first surface of the first wing structure. The kit may further include a third set of at least two propellers adapted to be disposed with respective propeller rotational axes side-by-side along a second portion of the second wing structure extending from a second surface of the first wing structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of an aerial vehicle or an aircraft or an unmanned aircraft or an unmanned aerial vehicle have been provided to address at least some of the issues identified earlier.

Various embodiments have proposed a configuration that is mechanically simple to implement, while providing the redundancy feature. Various embodiments may also incorporate additional features to enhance the control power of yaw in the helicopter-mode or hovering orientation or vertical flight mode (which is also roll in the airplane-mode or airplane orientation or horizontal orientation) which would not have been feasible in the unmanned aerial vehicle disclosed in PCT International Publication number WO2015/099603.

Figure 1:
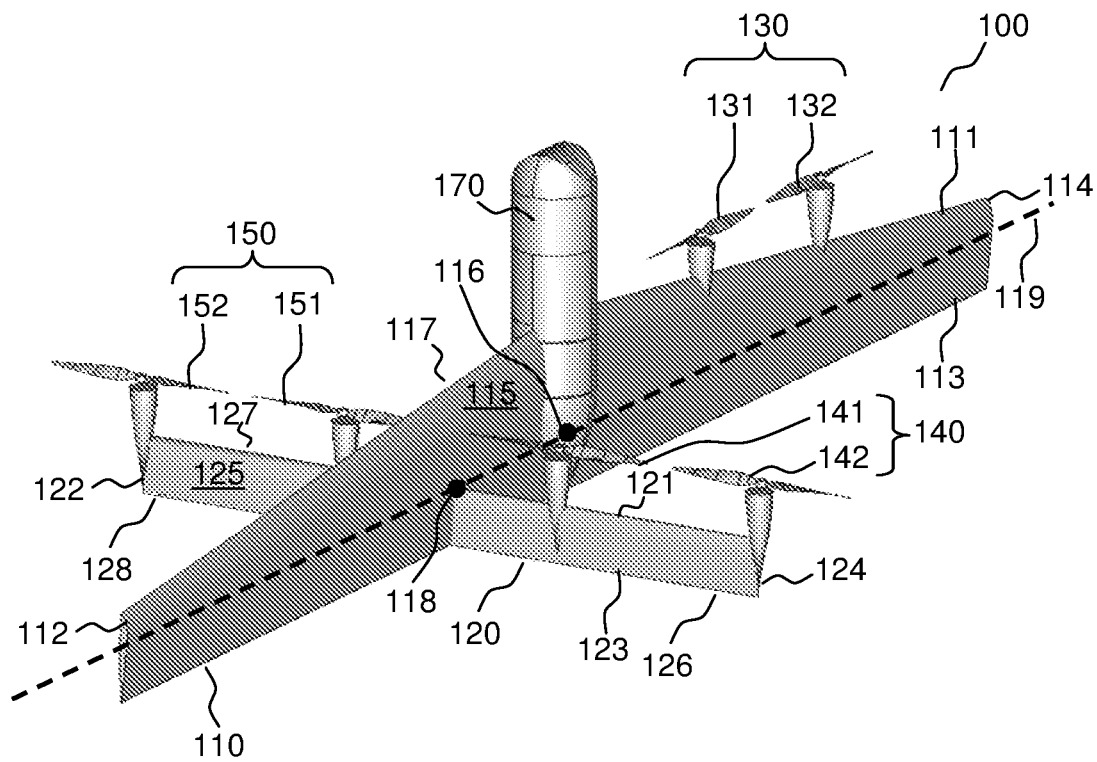
FIG. 1 shows an aerial vehicle in a vertical flight mode (or a helicopter-mode or hovering orientation) according to various embodiments.
Figure 2:
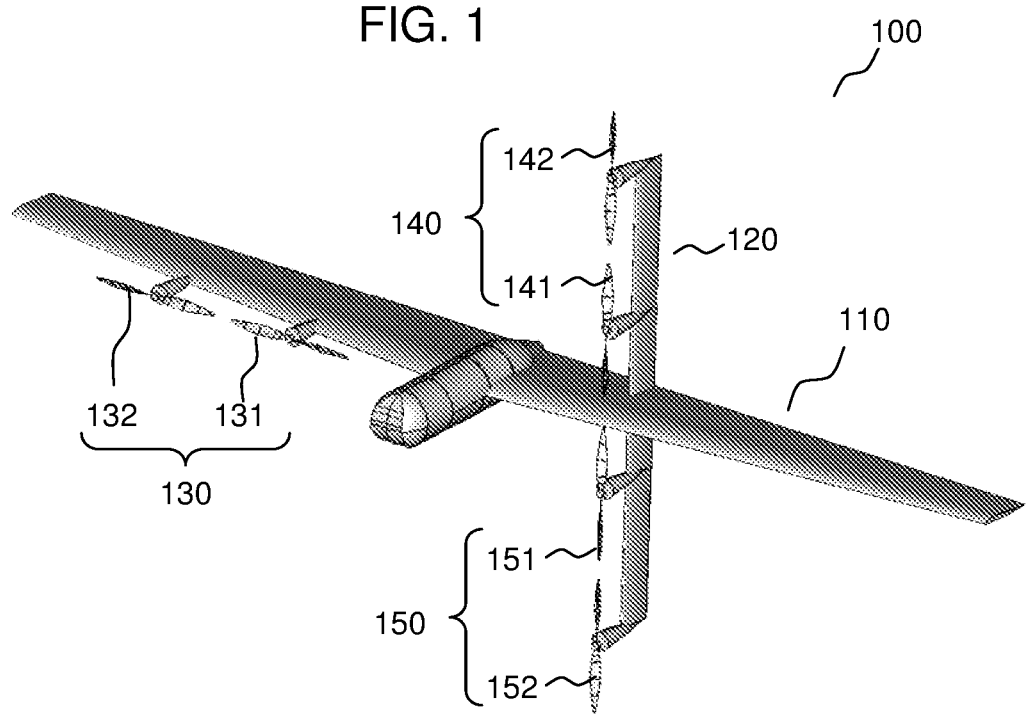
FIG. 2 shows the aerial vehicle of FIG. 1 in a horizontal flight mode (or an airplane-mode) according to various embodiments.

FIG. 1 shows an aerial vehicle 100 in a vertical flight mode (or a helicopter-mode or a hovering orientation) according to various embodiments. FIG. 2 shows the aerial vehicle 100 of FIG. 1 in a horizontal flight mode (or an airplane-mode or an airplane orientation) according to various embodiments. Although FIG. 1 shows the aerial vehicle 100 in a vertical flight mode (or a helicopter-mode or hovering orientation), the aerial vehicle 100 may also sit on the ground for vertically taking-off or landing in this orientation. Accordingly, the aerial vehicle 100 may not need additional weight or structure or aerodynamic drag for landing gears. As shown in FIG. 1 and FIG. 2, various embodiments of the aerial vehicle 100 may be a hex-rotor flying wing, including six propellers, each driven by its own motor, arranged asymmetrically with the flying wing. Accordingly, redundancy may be provided in various embodiments of the aerial vehicle 100 as failure of any one of the motors may not result in total loss of controllability about the respective control axis of the aerial vehicle 100. Shown in FIG. 2 is the aerial vehicle 100 in airplane mode orientation. As shown, the aerial vehicle 100 may be configured to incorporate a high aspect ratio monoplane wing for high cruise efficiency. According to various embodiments, the aerial vehicle 100 may be an aircraft, or an unmanned aircraft, or an unmanned aerial vehicle. According to various embodiments, the aerial vehicle 100 may be capable of vertical flight mode (or helicopter-mode or hovering orientation) and/or horizontal flight mode (or airplane-mode or airplane orientation).

As shown in FIG. 1 and FIG. 2, the aerial vehicle 100 may include a first wing structure 110. The first wing structure 110 may be configured to provide lift when the aerial vehicle 100 is in the horizontal flight mode (or the airplane-mode or the airplane orientation). According to various embodiments, the first wing structure 110 may include an airfoil structure. According to various embodiments, the first wing structure 110 may include a rounded leading edge 111 and a sharp trailing edge 113. According to various embodiments, a first surface 115 of the first wing structure 110 and a second surface 117 of the first wing structure 110 may have symmetrical curvatures. The first surface 115 may be on one side of the first wing structure 110 and the second surface 117 may be on an opposite side of the first wing structure 110. According to various embodiments, the first surface 115 of the first wing structure 110 and the second surface 117 of the first wing structure 110 may have asymmetrical curvatures. According to various embodiments, the first wing structure 110 may have a high aspect ratio wherein the ratio of wingspan squared over wing area of the first wing structure 110 may be high such that the first wing structure 110 may be long and slender resulting in higher cruise efficiency, more efficient aerodynamics and lower induced drag coefficient. According to various embodiments, the first wing structure 110 may have a low aspect ratio such that the aerial vehicle 100 may meet a desired compactness requirement.

As shown, a wing planform of the first wing structure 110 of the aerial vehicle 110 may be tapered towards the respective wingtips 112, 114. Accordingly, the chord length of the first wing structure 110 may vary along the span of the first wing structure 110 and the chord length of the first wing structure 110 may narrow towards the respective wingtips 112, 114. According to various embodiments, the wing planform of the first wing structure 110 of the aerial vehicle 100 may include other geometrical configurations including but not limited to rectangular configuration, elliptical configuration, cranked kite configuration, or delta configuration. The wing as seen from the front may also incorporate variations from a straight, horizontal wingspan including but not limited to dihedral, anhedral, gull-wing, or inverted gull-wing.

As shown, the aerial vehicle 100 may further include a second wing structure 120. According to various embodiments, the second wing structure 120 may include an airfoil structure. According to various embodiments, the second wing structure 120 may include a rounded leading edge 121 and a sharp trailing edge 123. According to various embodiments, a first surface 125 of the second wing structure 120 and a second surface 127 of the second wing structure 120 may have symmetrical curvatures. According to various embodiments, a planform of the second wing structure 120 of the aerial vehicle 100 may be rectangular such that the second wing structure 120 may include uniform cross section from one wingtip 122 to another wingtip 124. According to various embodiments, the planform of the second wing structure 120 may include other geometrical configurations including but not limited to tapered configuration, elliptical configuration, or delta configuration. According to various embodiments, the second wing structure 120 may be pylons or fins or the like.

According to various embodiments, the second wing structure 120 may intersect the first wing structure 110 perpendicularly at a position 118 offset from a midpoint 116 of a transverse axis 119 of the first wing structure 110 in a direction towards a first wingtip of the first wing structure 110. The first wingtip may be either one of wingtip 112 or wingtip 114 of the first wing structure 110. As illustrated in FIG. 1 and FIG. 2, the first wingtip may be wingtip 112 of the first wing structure 110 and a second wingtip may be wingtip 114 of the first wing structure 110. According to various other embodiments (not shown), the first wingtip may be wingtip 114 of the first wing structure 110 and the second wingtip may be wingtip 112 of the first wing structure 110. The transverse axis 119 of the first wing structure 110 may be an axis passing through the first wing structure 110 from wingtip 112 to wingtip 114. Accordingly, the second wing structure 120 may intersect the first wing structure 110 such that the first wing structure 110 and the second wing structure 120 may form a cross configuration, or a '†'—configuration, or an orthogonal configuration. Hence, the aerial vehicle 100 may be an asymmetric aerial vehicle. According to various embodiments, the first wing structure 110 and the second wing structure 120 may form a structure resembling a cross or '†' such that the first wing structure 110 may be a straight piece of the cross and the second wing structure 120 may be a transverse piece of the cross which may pass across or through the first wing structure 110. The second wing structure 120 may intercross the first wing structure 110 at a location displaced from the middle of the first wing structure 110 such that the second wing structure 120 may separate or divide the first wing structure 110 into two unequal portions, for example a longer portion and a shorter portion. Accordingly, the second wing structure 120 may be two protrusions, each protrusion projecting from respective sides or surfaces 115, 117 of the first wing structure 110 at a position within a first half of the first wing structure 110 excluding the middle of the first wing structure 110. Hence, the first wing structure 110 may separate or divide the second wing structure 120 into two portions, which may be two equal portions. Further, the second wing structure 120 and the first wing structure 110 may be at least substantially perpendicular to each other.

According to various embodiments, the first wing structure 110 may include a single continuous structure. According to various embodiments, the second wing structure 120 may also include a single continuous structure and may be inserted into and through the first wing structure 110 such that the second wing structure 120 may divide or demarcate or separate the first wing structure 110 into two portions by passing through the first wing structure 110. According to various embodiments, the second wing structure 120 may include two separate parts coupled to the first wing structure 110 such that the two separate parts of the second wing structure 120 may be joined across the first wing structure 110 to divide or demarcate or separate the first wing structure 110 into two portions.

As shown in FIG. 1 and FIG. 2, the aerial vehicle 100 may further include a first set 130 of at least two propellers 131, 132 with respective propeller rotational axes disposed side-by-side along a portion of the first wing structure 110. The said portion of the first wing structure 110 may be another half of the first wing structure 110 opposite to the half of the first wing structure 110 containing the second wing structure 120. Accordingly, as shown in FIG. 1 and FIG. 2, the said portion of the first wing structure 110 may be a portion extending between the midpoint 116 of the transverse axis 119 of the first wing structure 110 and the second wingtip 114 of the first wing structure 110. Accordingly, the aerial vehicle 100 may include a set of propellers 131, 132, including two or more propellers (or a plurality of propellers), arranged on a second half of the first wing structure 110 or separately distributed along the second half of the first wing structure 110. Each propeller 131, 132 of the first set 130 of propellers 131, 132 may be disposed side-by-side, or alongside each other, or beside each other, or lined abreast along a length of the second half of the first wing structure 110 such that the propellers 131, 132 may be facing a same direction. For example, as shown, the aerial vehicle 100 may include a first set 130 of two propellers 131, 132 lined abreast along the leading edge 111 of the second half of the first wing structure 110 such that the two propellers 131, 132 may be facing forward of the leading edge 111 with respective propeller rotational axes in a side-by-side configuration.

As shown in FIG. 1 and FIG. 2, the aerial vehicle 100 may further include a second set 140 of at least two propellers 141, 142 with respective propeller rotational axes disposed side-by-side along a first portion 126 of the second wing structure 120 extending from the first surface 115 of the first wing structure 110. Accordingly, the aerial vehicle may include a set of propellers 141, 142, including two or more propellers (or a plurality of propellers), arranged on a first half of the second wing structure 120 or separately distributed along the first half of the second wing structure 120. Each propeller 141, 142 of the second set 140 of propellers 141, 142 may be disposed side-by-side, or alongside each other, or beside each other, or lined abreast along a length of the first half of the second wing structure 120 such that the propellers 141, 142 may be facing a same direction. For example, as shown, the aerial vehicle 100 may include a second set 140 of two propellers 141, 142 lined abreast along the leading edge 121 of the first half of the second wing structure 120 such that the two propellers 141, 142 may be facing forward of the leading edge 121 with respective propeller rotational axes in a side-by-side configuration.

As shown in FIG. 1 and FIG. 2, the aerial vehicle 100 may further include a third set 150 of at least two propellers 151, 152 with respective propeller rotational axes disposed side-by-side along a second portion 128 of the second wing structure 120 extending from the second surface 117 of the first wing structure 110. The second surface 117 of the first wing structure 110 and the first surface 115 of the first wing structure 110 may be opposite to each other. Accordingly, the aerial vehicle may include a set of propellers 151, 152, including two or more propellers (or a plurality of propellers), arranged on a second half of the second wing structure 120 or separately distributed along the second half of the second wing structure 120. Each propeller 151, 152 of the third set 150 of propellers 151, 152 may be disposed side-by-side, or alongside each other, or beside each other, or lined abreast along a length of the second half of the second wing structure 120 such that the propellers 151, 152 may be facing a same direction. For example, as shown, the aerial vehicle 100 may include a third set 150 of two propellers 151, 152 lined abreast along the leading edge 121 of the second half of the second wing structure 120 such that the two propellers 151, 152 may be facing forward of the leading edge 121 with respective propeller rotational axes in a side-by-side configuration.

Figure 3:
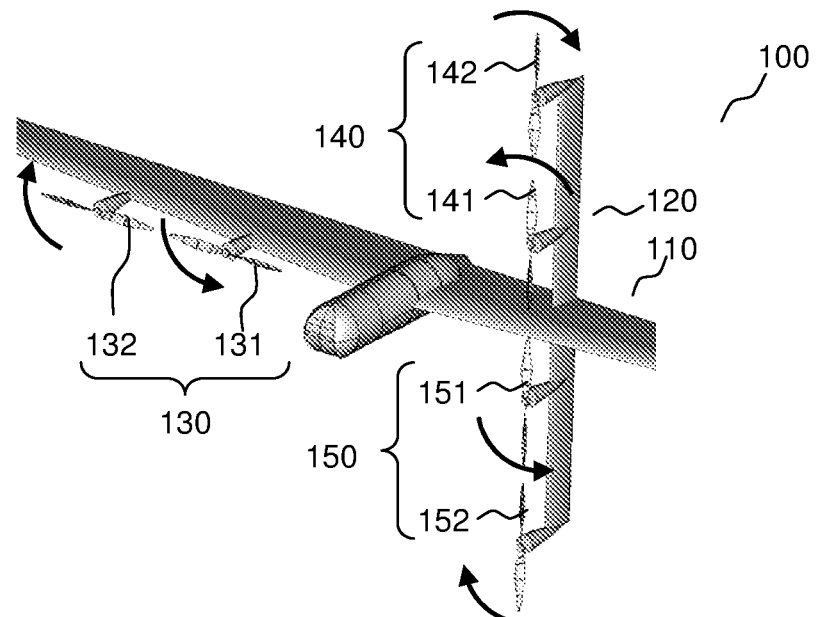
FIG. 3 shows rotational directions of the propellers of the aerial vehicle of FIG. 1 according to various embodiments.

FIG. 3 shows rotational directions of the propellers of the aerial vehicle 100 of FIG. 1 according to various embodiments. Shown in FIG. 3 are the directions of propeller rotations, looking from the front of the aerial vehicle in the airplane-mode or airplane orientation or horizontal flight mode. According to various embodiments, an inner propeller 131, 141, 151 of each of the first set 130 of at least two propellers, the second set 140 of at least two propellers, and the third set 150 of at least two propellers may be rotating in a first direction. Further, an outer propeller 132, 142, 152 of each the first set 130 of at least two propellers, the second set 140 of at least two propellers, and the third set 150 of at least two propellers may be rotating in a second direction. The second direction may be opposite of the first direction. The first direction may be counter-clockwise while the second direction may be clockwise, and vice versa. As shown, the outer propellers 132, 142, 152 may turn in the same direction (for example in the clockwise direction). The inner propellers 131, 141, 151 may turn in the opposite direction (for example in the counter-clockwise direction). The cross configuration or orientation of the propellers 131, 132, 141, 142, 151, 152, when seen from the front of the aerial vehicle 100, may enable the usual multi-rotor controls in helicopter-mode to be directly translated into the usual roll, pitch and yaw controls of airplane-mode.

Figure 4:
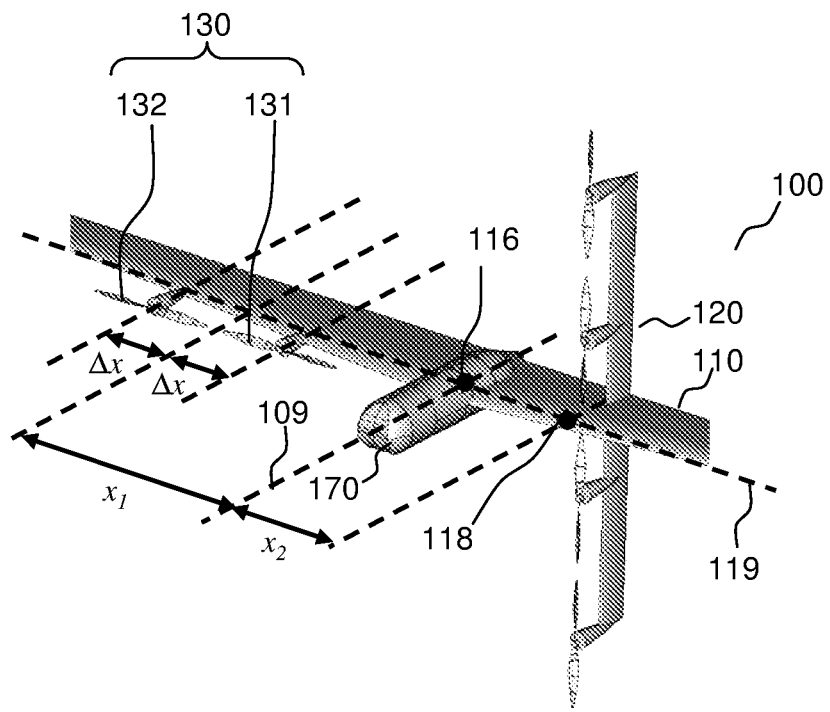
FIG. 4 shows the relative positioning of the propellers in the airplane orientation of the aerial vehicle of FIG. 1 according to various embodiments.

According to various embodiments, the positioning of the propellers 131, 132, 141, 142, 151, 152 along with the respective motors may be subject to equilibrium considerations. For equilibrium considerations, moment arms may be with respect to the lateral Centre of Gravity (CG) of the aerial vehicle 100. The lateral CG may be the left and right component of the overall CG of the aerial vehicle 100. For illustrative purposes only and not intended to be restrictive, embodiments of the aerial vehicle 100 may have the lateral CG coinciding with the midpoint 116 of the transverse axis 119 of the first wing structure 110 as shown in FIG. 4. Accordingly, the aerial vehicle 100 as shown in FIG. 4 may have the lateral CG at an intersection of a longitudinal axis 109 of the aerial vehicle 100 and the transverse axis 119 of the first wing structure 110. The longitudinal axis 109 of the aerial vehicle 100 may be a longitudinal axis of the fuselage 170 of the aerial vehicle 100.

According to various other embodiments (not shown), the lateral CG of various embodiments of the aerial vehicle 100 may be at other positions or locations. Generally, for symmetrical aircraft, flight stability and control consideration largely deal with only the longitudinal CG of the aircraft. The longitudinal CG may be the fore and aft component of the overall CG of the aircraft. For the asymmetrical aerial vehicle 100 according to the various embodiments, the location of the lateral CG of the aerial vehicle 100 according to various embodiments may also be determined from flight stability and control considerations.

FIG. 4 shows the relative positioning of the propellers 131, 132, 141, 142, 151, 152 in the airplane orientation, when the lateral CG of the aerial vehicle 100 coincides with the midpoint 116 of the transverse axis 119 of the first wing structure 110, according to various embodiments. With reference to the relative positioning illustrated in FIG. 4, when all the six propellers 131, 132, 141, 142, 151, 152 produce the same amount of thrust, equilibrium of moment about a yaw axis of the aerial vehicle 100 in the airplane orientation would require that $$x_1 = 2x_2 \tag{1}$$

According to various embodiments, $x_1$ may be a mean distance of the inner propeller 131 and the outer propeller 132 of the first set 130 of at least two propellers from the lateral CG, which is the midpoint 116 of the transverse axis 119 of the first wing structure 110 in the embodiment as shown in FIG. 4. Further, $x_2$ may be an offset distance of the second wing structure 120 from the lateral CG, which is again the midpoint 116 of the transverse axis 119 of the first wing structure 110 in the embodiment as shown in FIG. 4. Accordingly, the mean distance of the propellers 131, 132 of the first set 130 of at least two propellers from the lateral CG (i.e. the midpoint 116 of the first wing structure 110 in the embodiment as shown in FIG. 4) may be twice the offset distance of the second wing structure 120 from the lateral CG (i.e. the midpoint 116 of the first wing structure 110 in the embodiment as shown in FIG. 4).

Further, equilibrium of pitching moments about a pitch axis of the aerial vehicle 100 would require that the inner propeller 141 of the second set 140 of at least two propellers and the inner propeller 151 of the third set 150 of at least two propellers be spaced equidistant from the first wing structure 110. Accordingly, the propeller 141 of the second set 140 of at least two propellers nearest to the first surface 115 of the first wing structure 110 and the propeller 151 of the third set 150 of at least two propellers nearest to the second surface 117 of the first wing structure 110 may be equidistant from the respective surfaces 115, 117 of the first wing structure 110. The same principle applies for outer propellers 142, 152. Accordingly, the outer propeller 142 of the second set 140 of at least two propellers and the outer propeller 152 of the third set 150 of at least two propellers may be spaced equidistant from the first wing structure 110. Accordingly, the propeller 142 of the second set 140 of at least two propellers farthest away from the first surface 115 of the first wing structure 110 and the propeller 152 of the third set 150 of at least two propellers farthest away from the second surface 117 of the first wing structure 110 may be equidistant from the respective surfaces 115, 117 of the first wing structure 110.

According to various embodiments, the aerial vehicle 100 may include a controller. The controller may be configured to implement various flight control algorithms according to the flight control principle as described herein to control the propellers 131, 132, 141, 142, 151, 152 so as to control the pitch, yaw and roll of the aerial vehicle 100 in the helicopter-mode or the airplane-mode as well as to provide stability augmentation and flight stabilization during various flight maneuvers of the aerial vehicle 100. The controller may be understood as any kind of a logic implementing entity, which may be special purpose circuitry or a processor executing software stored in a memory, firmware, or any combination thereof. Thus, the controller may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). The controller may also be a processor executing software, e.g. any kind of computer program, e.g. a computer program using a virtual machine code such as e.g. Java. According to various other embodiments, a user may also manually correct imbalances in flight of the aerial vehicle 100 without utilizing the controller. The user may manually correct the imbalances in flight based on the flight control principle as described herein or based on intuition.

Referring to FIG. 3 and FIG. 4, the flight control principle of the aerial vehicle 100 in the airplane-mode flight may be according to the following.

For pitch control in the airplane-mode, the aerial vehicle 100 or the controller of the aerial vehicle 100 may be configured to generate differential thrust between the second set 140 of at least two propellers and the third set 150 of at least two propellers. For example, to produce a nose-down pitching moment, each of the propellers 141, 142 of the second set of at least two propellers may be operated or directed to increase thrust by an amount ΔT, and each of the propellers 151, 152 of the third set of at least two propellers may be operated or directed to reduce thrust by the same amount ΔT.

For yaw control in the airplane-mode, the aerial vehicle 100 or the controller of the aerial vehicle 100 may be configured to equally change the thrust in a certain sense for the propellers 141, 142 of the second set 140 of at least two propellers and the propellers 151, 152 of the third set 150 of the at least two propellers, and configured to change the thrust in the opposite sense for the propellers 131, 132 of the first set 130 of at least two propellers. For example, to produce a yawing moment that changes heading to the right, each of the propellers 141, 142 of the second set 140 of at least two propellers as well as the propellers 151, 152 of the third set 150 of at least two propellers may be operated or directed to increase thrust by an amount ΔT, and each of the propellers 131, 132 of the first set 130 of at least two propellers may be operated or directed to reduce thrust by the same amount ΔT. Accordingly, $$\text{The yaw control moment produced} = 4 \cdot \Delta T \cdot x_2 + \Delta T \cdot (x_1 + \Delta x) + \Delta T \cdot (x_1 - \Delta x) \quad (2)$$
$$= 4 \cdot \Delta T \cdot x_2 + 2 \cdot \Delta T \cdot x_1$$

From Eq. (1), knowing that $x_1 = 2x_2$, substituting in Eq. (2), $$\text{The yaw control moment produced} = 8 \cdot \Delta T \cdot x_2 \quad (3)$$

According to various embodiments, various options may be available for roll control in the airplane-mode. According to an option for roll control in the airplane-mode, the aerial vehicle 100 or the controller for the aerial vehicle 100 may be configured to generate differential thrust between the inner propellers 131, 141, 151 and the outer propellers 132, 142, 152 of each of the first set 130 of at least two propellers, the second set 140 of at least two propellers and the third set 150 of at least two propellers. For example, to produce a rolling moment in the airplane-mode such that the starboard wing is rolling downwards and the port wing upwards, each of the clockwise-rotating outer propellers 132, 142, 152 may be operated or directed to increase thrust by an amount ΔT, and the counter-clockwise-rotating inner propellers 131, 141, 151 may be operated or directed to decrease thrust by the same amount ΔT.

However, in controlling roll based on the above in the airplane-mode, a small amount of residual yaw moment may be produced due to the difference in distance between the inner propeller 131 and the outer propeller 132 of the first set 130 of at least two propellers from the yaw axis of the aerial vehicle 100. In the above example whereby the starboard wing is rolling downwards and the port wing upwards, a leftwards residual yaw moment may be produced, and may be given by $$\text{Residual yaw moment} = \Delta T(x_1 + \Delta x) - \Delta T(x_1 - \Delta x)$$
$$= 2 \cdot \Delta T \cdot \Delta x$$

According to various embodiments, in the airplane orientation of the aerial vehicle 100, the aerial vehicle 100 may be configured to generate a control moment about a roll axis of the aerial vehicle 100 such that the control moment may be free of either one or both of yaw and pitch residual components.

According to various embodiments, the residual yaw moment may be correctable by a small amount of yaw control corresponding to a corrective incremental thrust $\Delta T_{corr}$ determined from Eq. (3) as follows.

$$8 \cdot \Delta T_{corr} \cdot x_2 = 2 \cdot \Delta T \cdot \Delta x \quad (4)$$

-continued $$\Delta T_{corr} = \left(\frac{1}{4}\right) \cdot \left(\frac{\Delta x}{x_2}\right) \cdot \Delta T$$

Accordingly, in an airplane orientation of the aerial vehicle 100, when the aerial vehicle 100 is operated to generate a roll moment via generating differential thrust between the inner propellers 131, 141, 151 and the outer propellers 132, 142, 152 of each of the first set 130 of at least two propellers, the second set 140 of at least two propellers and the third set 150 of at least two propellers, the aerial vehicle 100 or the controller of the aerial vehicle 100 may be configured to compensate the residual yaw moment produced. Further, the aerial vehicle 100 or the controller of the aerial vehicle 100 may be configured to apply a corrective thrust adjustment $\Delta T_{corr}$ to the propellers 141, 142, 151, 152 of each of the second set 140 of at least two propellers and the third set 150 of at least two propellers, and configured to inversely apply the corrective thrust adjustment $\Delta T_{corr}$ to the propellers 131, 132 of the first set 130 of at least two propellers.

According to another option for roll control in the airplane-mode, similar to the above option, the aerial vehicle 100 or the controller for the aerial vehicle 100 may be configured to generate differential thrust between the inner propellers 131, 141, 151 and the outer propellers 132, 142, 152 of each of the first set 130 of at least two propellers, the second set 140 of at least two propellers and the third set 150 of at least two propellers. However, to address the residual yaw moment produced, a different approach is adopted. In this option, either or both of propellers 131, 132 of the first set 130 of at least two propellers may be incremented with a corrective thrust $\delta T_{corr}$ that may eliminate the residual yaw moment. However, this may result in a residual thrust which may in turn need a small throttle input correction. An example of incrementing both propellers 131, 132 of the first set 130 of at least two propellers is illustrated as follows.

Accordingly, to eliminate the residual yaw moment, the aerial vehicle 100 or the controller of the aerial vehicle 100 may be configured to apply a corrective thrust adjustment to either or both of the inner propeller 131 and the outer propeller 132 of the first set 130 of at least two propellers. For example, the increase in the thrust of the outer propeller 132, $\Delta T$, may be reduced by $\delta T_{corr}$. The decrease in the thrust of the inner propeller 131, $\Delta T$, may be reduced further by $\delta T_{corr}$. To produce zero residual yaw moment, $\delta T_{corr}$ is determined as $$(\Delta T - \delta T_{corr})(x_1 + \Delta x) - (\Delta T + \delta T_{corr})(x_1 - \Delta x) = 0 \quad (5)$$

$$\delta T_{corr} = \frac{\Delta x}{x_1} \cdot \Delta T$$

In eliminating the residual yaw moment, a residual thrust reduction of $2\delta T_{corr}$ may be produced which may be corrected by a small throttle input. The throttle input may power up or down all the motors of the propellers 131, 132, 141, 142, 151, 152 simultaneously by an equal amount. According to various embodiments, a corrective throttle input may be applied to increase the thrust of all six propellers 131, 132, 141, 142, 151, 152, each by an amount equal to the residual thrust reduction divided by the number of propellers, or $\delta T_{corr}/3$.

Accordingly, the aerial vehicle 100 or the controller of the aerial vehicle 100 may be configured to apply a corrective throttle input to all the propellers 131, 132, 141, 142, 151, 152, with the thrust of each propeller being adjusted by a value equivalent to an equal fraction of the residual thrust to be corrected, i.e. the residual thrust divided by the number of propellers. Hence, the aerial vehicle 100 or the controller of the aerial vehicle 100 may be configured to compensate a residual thrust produced from the application of the corrective thrust adjustment to the inner propeller 131 and the outer propeller 132 of the first set 130 of at least two propellers by applying a corrective throttle input to the aerial vehicle to adjust the respective thrust of all the propellers 131, 132, 141, 142, 151, 152 by an equal amount.

According to another option for roll control in the airplane-mode, to avoid generating a residual yaw moment, the propellers 131, 132 of the first set 130 of at least two propellers may not be used. Accordingly, the aerial vehicle 100 or the controller of the aerial vehicle 100 may be configured to generate differential thrust between the inner propellers 141, 151 and the outer propellers 142, 152 of each of the second set 140 of at least two propellers and the third set 150 of at least two propellers only. However, in this manner, the roll control power may be reduced by one-third.

Accordingly, in an airplane orientation of the aerial vehicle 100, the aerial vehicle 100 or the controller of the aerial vehicle 100 may be configured to generate a roll moment via generating a differential thrust between the inner propellers 141, 151 and the outer propellers 142, 152 of each of the second set 140 of at least two propellers and the third set 150 of at least two propellers, and ceasing the use of the propellers 131, 132 of the first set 130 of at least two propellers.

Referring to FIG. 3 and FIG. 4, it can be seen that the cross configuration or orientation of the propellers 131, 132, 141, 142, 151, 152, when viewed from the front of the aerial vehicle 100, may enable the roll, pitch and yaw controls of the airplane-mode to be directly translated to corresponding roll, pitch and yaw controls in the helicopter-mode.

According to various embodiments, in the horizontal flight mode (or the airplane-mode or the airplane orientation), pitch and yaw controls may be fully decoupled, while roll control may be slightly coupled with either yaw control or thrust. Further only one set of flight control effectors may be used for both the horizontal flight mode (or the airplane-mode or the airplane orientation) and the vertical flight mode (or the helicopter-mode or hovering orientation). In addition, no additional control surfaces or tilting mechanisms may be required. Various embodiments may also provide for redundancy in case of power plant failure. The above features may result in a distinct reduction in high complexity of developing a transition-capable runway-independent aircraft.

According to various embodiments, the aerial vehicle 100 may be configured to have low centre of gravity. The features and configurations for an inherently low centre of gravity position may be shown in FIG. 1. As shown, a base of the aerial vehicle 100 may be inherently wide relative to the low centre of gravity. This may improve the aerial vehicle's robustness to toppling in situations including but not limited to ground handling, landing in a wind, or rolling ship decks. Other features of the aerial vehicle 100 for low centre of gravity may include: no tail boom; fuselage may be blended into the first wing structure 110 and may not extend significantly above the first wing structure 110; and the trailing edge 123 of the second wing structure 120 for the second set 140 of at least two propellers and the third set 150 of at least two propellers may be configured to align or be positioned at the ground. Accordingly, the second wing structure 120 may also support the aerial vehicle 100 on the ground, resulting in no need for additional landing gears. An additional function of the second wing structure 120 may be to provide directional stability in airplane mode flight.

According to various embodiments, each propeller 131, 132, 141, 142, 151, 152 may be independently driven by the respective motor to provide redundancy in the event of power plant failure. In this configuration, the mechanical arrangement may be much simpler than having coaxial mechanism.

According to various embodiments, the aerial vehicle 100 may further include a fuselage 170 at the middle 116 of the first wing structure 110. The fuselage 170 may be blended with the first wing structure 110 at the middle 116 of the first wing structure 110. Accordingly, the aerial vehicle 100 may be free of clear dividing line between the first wing structure 110 and the fuselage 170. Hence, the first wing structure 110 may be smoothly blended with the fuselage 170 and a transition between the first wing structure 110 and the fuselage 170 may be free of abrupt edges.

According to various embodiments, the aerial vehicle 100 may be free of tail boom or may be tailless. Accordingly, the aerial vehicle 100 may be free of tail assembly or boom extending from a rear of the fuselage 170.

According to various embodiments, a portion of a trailing edge 113 of the first wing structure 110 and a portion of a trailing edge 123 of the second wing structure 120 may be aligned and contained in a same plane for contacting a ground. According to various other embodiments, the first wing structure 110 may have protruding structures jutting out from the trailing edge 113 and the second wing structure 120 may have protruding structures jutting out from the trailing edge 123. The tips of the protruding structures of the trailing edge 113 and the trailing edge 123 may be contained in a plane for contacting with a ground. Accordingly, the aerial vehicle 100 may be orientated to sit on the ground, e.g. before take-off or after landing, with the aligned portion of a trailing edge 113 of the first wing structure 110 and aligned portion of a trailing edge 123 of the second wing structure 140 flat against the ground or with the protruding portions of the trailing edge 113 and the trailing edge 123 lying in contact with the ground. Hence, the aerial vehicle 100 may vertically take-off and land in the sitting orientation.

According to various embodiments, the aerial vehicle 100 may transit from vertical flight mode (or the helicopter-mode or hovering orientation) to the horizontal flight mode (or airplane-mode or airplane orientation) using a vertical climb followed by a circular maneuver. The circular maneuver may be typical of that used by airplanes in aerobatic displays, and only involves linear aerodynamics. Throughout the transition maneuver, angle-of-attacks may be within the linear, pre-stall range. There may be no need to deal with the characteristics of complex, non-linear high angle-of-attack aerodynamics, and the complex change in stability characteristics during the development of an aerodynamic model for autonomous transition. Furthermore, as the transition uses only a narrow range of angle-of-attack and flight speed, the size of the aerodynamic database needed for adequate coverage of the transition envelope may be very significantly reduced, along with the cost and effort needed to generate it. These may result in distinct reductions in the high complexity of aerodynamic modeling for autonomous transition development.

Figure 5:
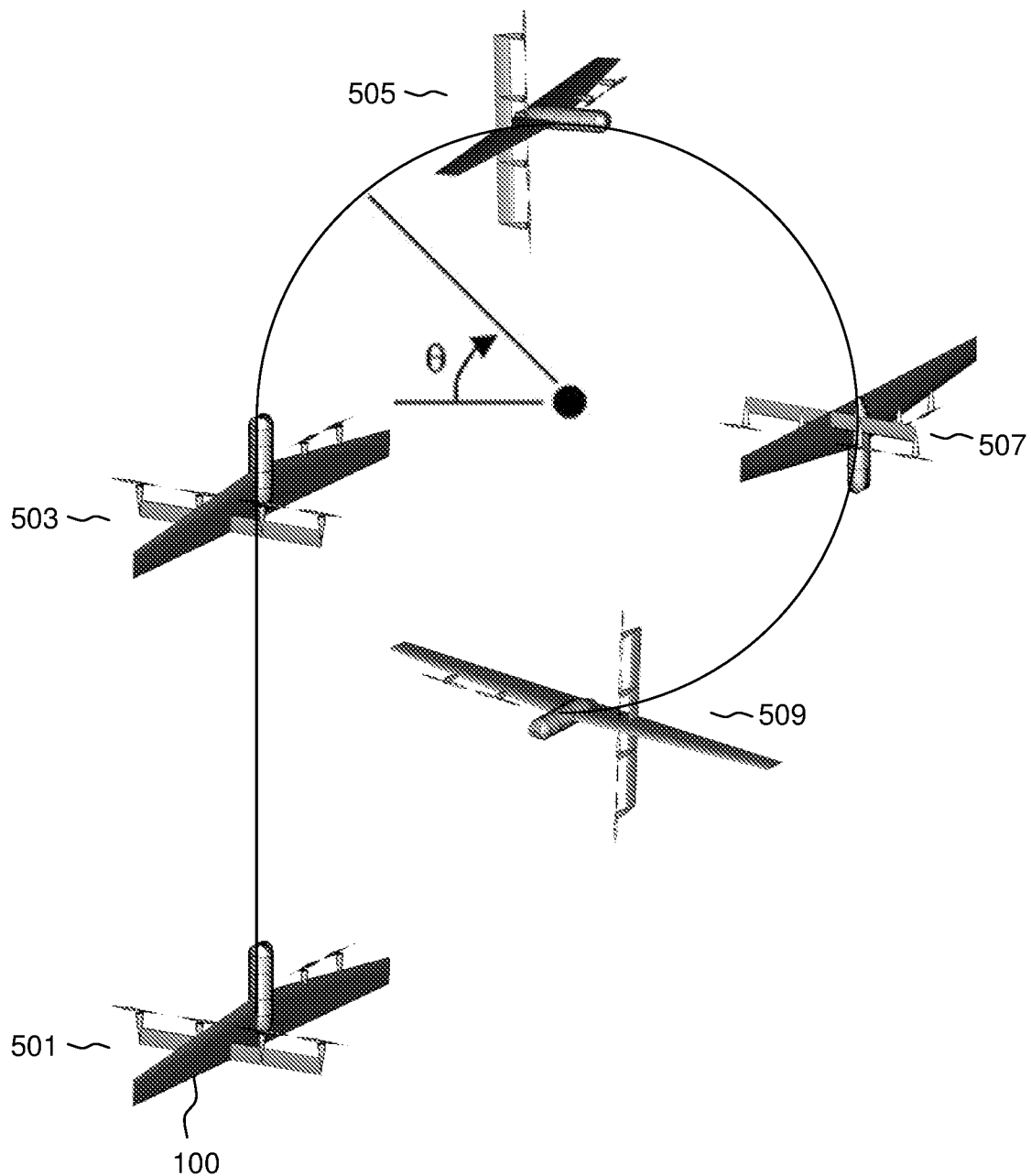
FIG. 5 shows a schematic diagram of a transition maneuver of the aerial vehicle of FIG. 1 according to various embodiments.

FIG. 5 shows a schematic diagram of a transition maneuver of the aerial vehicle 100 according to various embodiments. As shown, the transition maneuver may include five stages. In stage 501, the aerial vehicle 100 may takeoff vertically. In stage 503, the aerial vehicle 100 may reach at least stall speed, may develop aerodynamic lift in the radially inward direction, and may initiate a circular maneuver. In stage 505, the aerial vehicle 100 may transit to inverted flight. In stage 507, the aerial vehicle 100 may transit into downward flight. In stage 509, the aerial vehicle 100 may transit into normal airplane-mode flight. Referring to FIG. 5, the power requirements may be most severe at stage 503, which may involve vertically climbing flight. The powerplant of the aerial vehicle 100 may have to be sized to provide adequate power to move through this stage. According to various embodiments, the aerial vehicle 100 may include commercially available fuel cells, or a hybrid fuel cell system. A hybrid fuel cell system may include lithium-polymer batteries providing power for the more severe vertical and transition flight phases, following which the fuel cell may kick in for airplane mode cruise flight.

In the following, an example is described, which illustrates the method for determining the maximum power at stage 503. In this example, climb to $V_{stall}$ (thus lift coefficient $C_L = C_{Lmax}$) may be used. The method may also be used for climb to speeds higher than $V_{stall}$ ($C_L < C_{Lmax}$).

From F=ma, the left-hand side represents the net upward force given by

Thrust minus Weight minus Aerodynamic Drag

Thrust is a required value to be determined. Weight is known. Aerodynamic drag can, for example, conservatively use the maximum value which occurs at $V_{stall}$ ($\frac{1}{2} * \rho * V_{stall}^2 * S * (C_D$ corresponding to $C_{Lmax}$)). This may ensure some over-sizing, and thereby margin of safety, of the thrust required. Accounting for aerodynamic drag in this simplified manner may tend to result in thrust required which may be about 10% more than that which omits aerodynamic drag. Alternatively, the aerodynamic drag may be expressed in terms of a time-varying dynamic pressure and lift coefficient. The increased complexity, although more exact, does not seem to be warranted, as aerodynamic drag may not be a significant contributor to thrust required. Hence, the former simpler method for accounting for aerodynamic drag is used in this description.

For the right-hand side (ma), mass is known. Acceleration can be determined by specifying a safe climb altitude H at which $V_{stall}$ is reached. Kinematics of uniformly accelerated motion would give $$a = V_{stall}^2 / (2H)$$

The required thrust to reach $V_{stall}$ in a vertical climb to altitude H can now be determined, since weight, aerodynamic drag and acceleration are now all known.

Knowing the thrust required at $V_{stall}$, then for a given propeller, the required propeller rpm and power can be determined, for example, from the propeller performance tables.

The looping circular maneuver at various points is described by θ, as illustrated in FIG. 5. The lift coefficient $C_L$ as a function of θ can be determined from Newton's Second Law applied in the radial direction.

Consider a general position along the circular flight path, described by θ in FIG. 5.

Aerodynamic lift (radially inwards,=$q*S*C_L$)+$W*\sin\theta$= $(m*V^2)/R$ $$qSC_L + W\sin\theta = \frac{mV^2}{R}$$

On the left-hand side, the first term represents the aerodynamic lift acting radially inwards. The second term is the radial component of the weight. The right-hand side is the product of mass and radial acceleration.

The radius of turn R may be determined at the beginning of the maneuver when $\theta=0$. At this point, only the aerodynamic lift force is used to initiate the circular flight path. Also, velocity=$V_{stall}$ and $C_L=C_{Lmax}$.

At other points of the circular flight path, $0°<\theta<180°$ (between stages 503 and 507 in FIG. 5), the weight now has a radial component that also contributes to the radial acceleration. The aerodynamic lift force can be reduced from the initial value at $\theta=0°$, and thus over the range $0°<\theta<180°$, $C_L<C_{Lmax}$, which is the regime for linear aerodynamics.

After stage 507, the radial component of weight subtracts from that of the aerodynamic force, gradually reducing the radial acceleration to zero at stage 509, where level flight proceeds from there.

Figure 6:
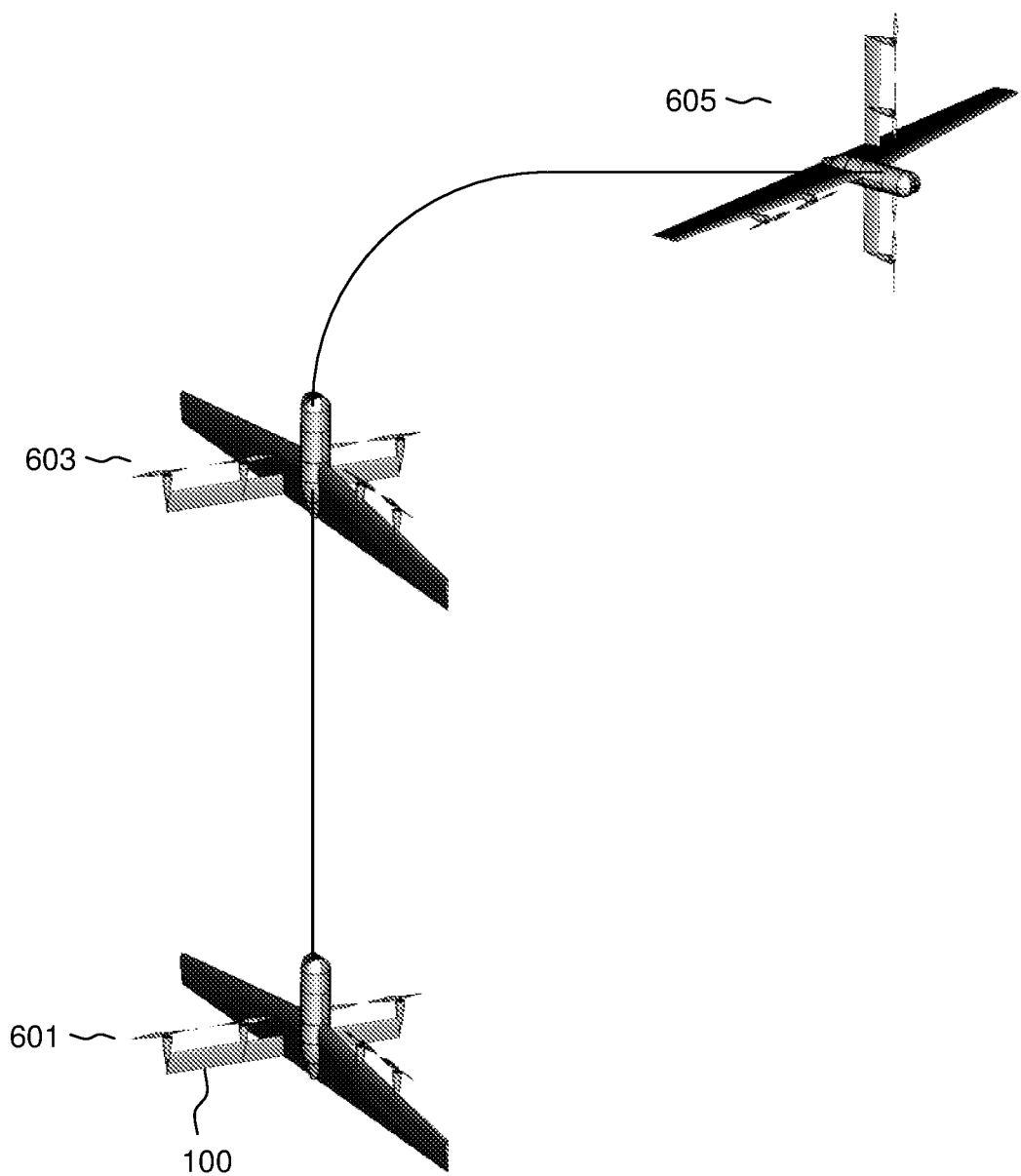
FIG. 6 shows a schematic diagram of another variation of a transition maneuver of the aerial vehicle of FIG. 1 according to various embodiments.

FIG. 6 shows a schematic diagram of another variation of circular maneuver of the aerial vehicle 100 according to various embodiments. As shown, the transition maneuver may include three stages. In stage 601, the aerial vehicle 100 may takeoff vertically. In stage 603, the aerial vehicle 100 may reach at least stall speed, may develop aerodynamic lift in the radially inward direction, and may initiate a circular maneuver. In stage 605, the aerial vehicle 100 may transit into normal airplane-mode flight.

The main difference from the maneuver of FIG. 5 is that in stage 603, a negative, rather than positive (as in stage 503 of FIG. 5), angle-of-attack may be needed to produce the radially inward force to initiate the circular maneuver.

The analysis to obtain $C_L$ versus $\theta$ would be the same as before, with the values of $C_{Lmax}$ and $V_{stall}$ corresponding to negative angle-of-attack. It would also illustrate that $C_L$ remains in the linear range.

As negative angle-of-attack is used to initiate the maneuver at stage 603 of FIG. 6, the force that can be produced is generally smaller than the previous example which used positive angle-of-attack, since the magnitude of negative $C_{Lmax}$ is usually smaller than that of positive $C_{Lmax}$. This may result in the radius of the maneuver being larger than that of FIG. 5.

Figure 7:
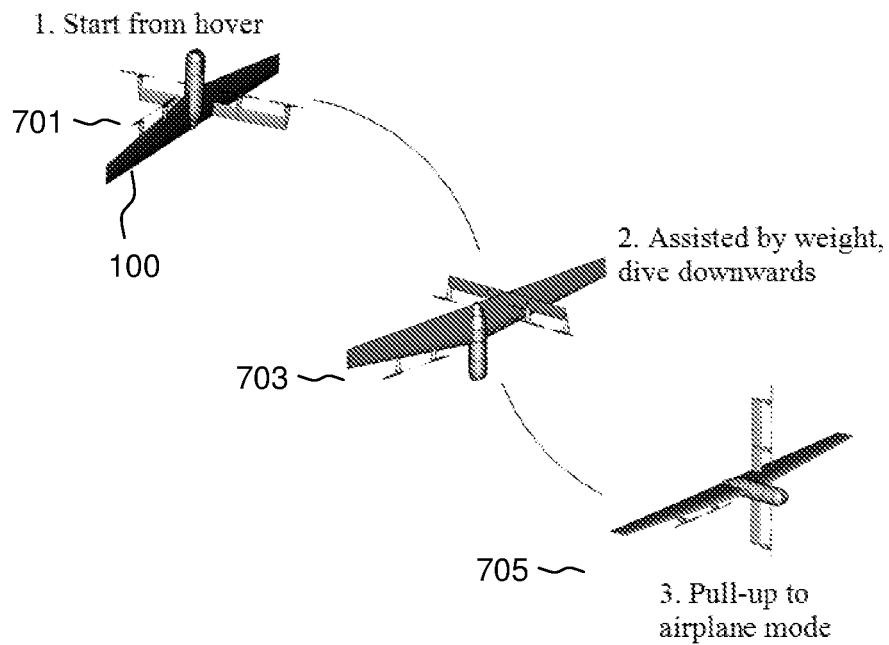
FIG. 7 shows a schematic diagram of yet another variation of transition maneuver of the aerial vehicle of FIG. 1 according to various embodiments.

FIG. 7 shows a schematic diagram of yet another variation of circular maneuver of the aerial vehicle 100 according to various embodiments. As shown, the transition maneuver may include three stages. In stage 701, the aerial vehicle 100 may be hovering in the helicopter-mode. In stage 703, the aerial vehicle 100 may be assisted by weight and may dive downwards. In stage 705, the aerial vehicle 100 may pull up from the dive to transit into normal airplane-mode flight.

The main difference from the maneuvers of FIG. 5 and FIG. 6 is that the high power requirements for vertical climb to at least stall speed to initiate the transition maneuver may no longer be needed. The aerial vehicle 100 may only need to be in static hover at the start of the maneuver. This may reduce the size and weight of the powerplants of the aerial vehicle 100.

Figure 8:
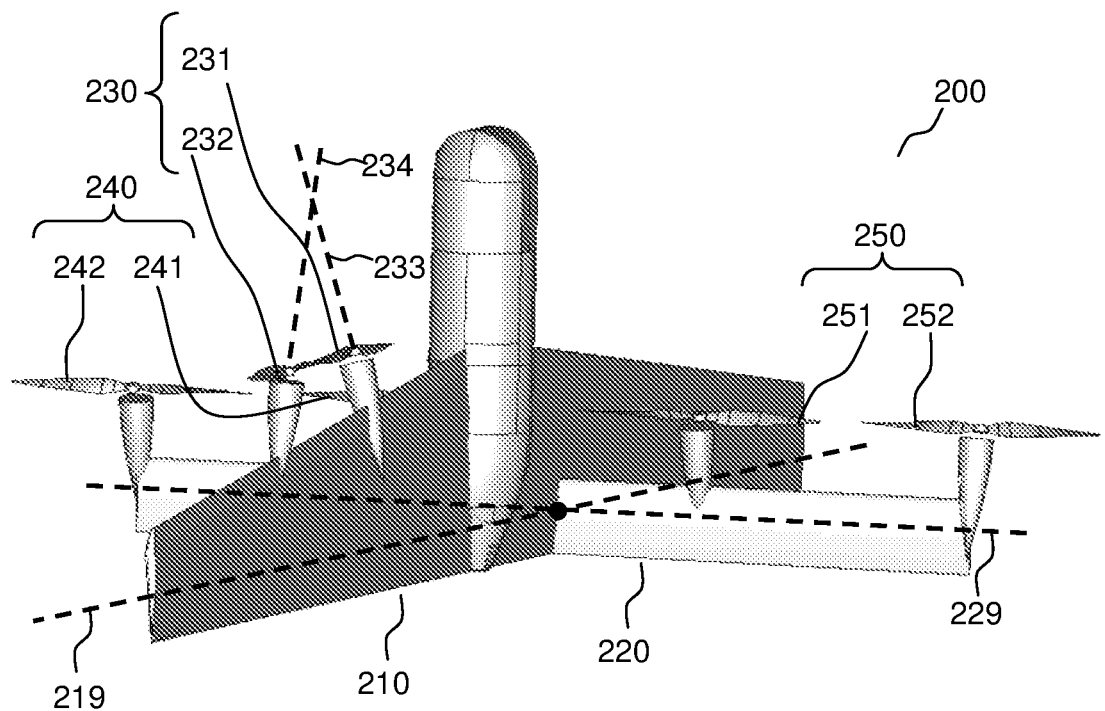
FIG. 8 shows show an aerial vehicle according to various embodiments.
Figure 9:
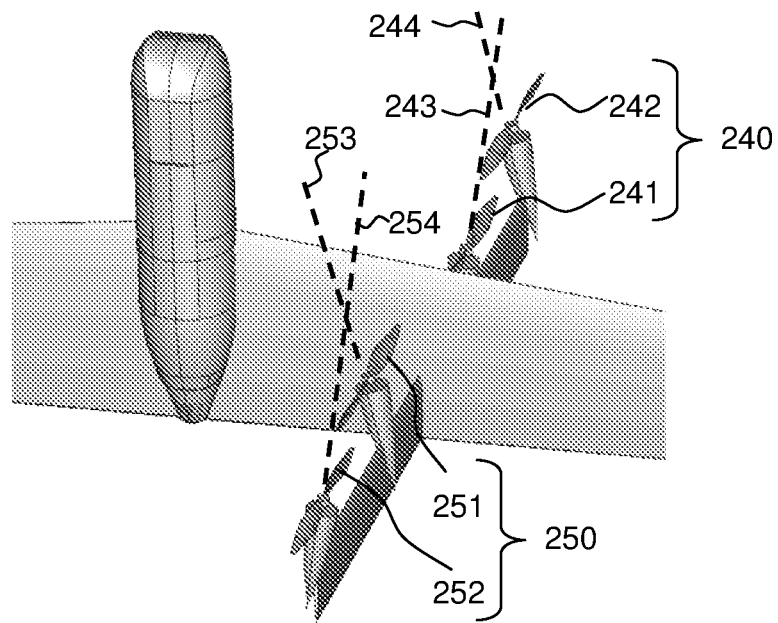
FIG. 9 shows an enlarged view of a portion of the aerial vehicle of FIG. 8 according to various embodiments.

FIG. 8 and FIG. 9 show an aerial vehicle 200 according to various embodiments. According to various embodiments, the aerial vehicle 200 may be configured to enhance the control power of helicopter-mode yaw, which is also airplane-mode roll. According to various embodiments, the respective motors of the respective propellers 231, 232, 241, 242, 251, 252 may be fixedly installed at differential tilt such that the respective rotational axes may be tilted, as illustrated in FIG. 8 and FIG. 9, for the first set 230 of at least two propellers on the first wing structure 210 as well as the second set 240 of at least two propellers and third set 250 of at least two propellers on the second wing structure 220 respectively.

For each group of three propellers turning in the same direction (e.g. the clockwise group of three propellers including the outer propellers 232, 242, 252 according to FIG. 8, and the counter-clockwise group of three propellers including the inner propellers 231, 241, 251), there may be a natural tendency to yaw in the opposite direction. Accordingly, the respective motors for the respective propellers may be fixedly installed with differential tilt as to add to the natural yaw tendency.

As an example according to FIG. 8, with the clockwise group of three propellers, i.e. the outer propellers 232, 242, 252, the rotation of the propellers 232, 242, 252 may be clockwise as seen from the top. This may produce a natural tendency to yaw in the counter-clockwise sense. Accordingly, the respective motors for the respective propellers 232, 242, 252 in this group of three propellers may be fixedly installed with differential tilt as to add to the natural tendency to yaw counter-clockwise. Hence, when the thrust of this clockwise-rotating group of propellers is increased to produce counter-clockwise yaw control moment, it can be seen that the differential tilt of the respective motors adds to the control moment. Vice versa for the counter-clockwise group of three propellers, i.e. the inner propellers 231, 241, 251.

According to various embodiments, in the hovering orientation of the aerial vehicle 200, respective propeller rotational axes 233, 234 of the propellers 231, 232 of the first set 230 of at least two propellers may be angled off-vertical in respective planes which may be at least substantially perpendicular to a transverse axis 219 of the first wing structure 210. Further, in the hovering orientation of the aerial vehicle 200, respective propeller rotational axes 243, 244, of the propellers 241, 242 of the second set 240 of at least two propellers and respective propeller rotational axes 253, 254 of the third set 250 of at least two propellers may also be angled off-vertical in respective planes which may be perpendicular to a transverse axis 229 of the second wing structure 220.

According to various embodiments, the respective propeller rotational axes of the inner propellers 231, 241, 251 of each of the first set 230 of at least two propellers, the second set 240 of at least two propellers and the third set 250 of at least two propellers may be angled off-vertical in respective directions such that the respective inner propellers 231, 241, 251 may be orientated to cause a moment about the yaw axis in a same first moment direction when the aerial vehicle 200 is in the hovering orientation. For example, when the inner propellers 231, 241, 251 are rotating counter clockwise, the respective propeller rotational axes of the inner propellers 231, 241, 251 may be angled off-vertical in respective directions such that the orientation of the respective inner propellers 231, 241, 251 may be in the respective directions that may contribute to or supplement or boost or augment or add to the generation of clockwise yaw control moment of the aerial vehicle 200 in the hovering orientation.

According to various embodiments, the respective propeller rotational axes of the outer propellers 232, 242, 252 of each of the first set 230 of at least two propellers, the second set 240 of at least two propellers and the third set 250 of at least two propellers may be angled off-vertical in respective directions such that the respective outer propellers 232, 242, 252 may be orientated to cause a moment about the yaw axis in a same second moment direction when the aerial vehicle 200 is in the hovering orientation. The second moment direction may be opposite to the first moment direction. For example, when the outer propellers 232, 242, 252 are rotating clockwise, the respective propeller rotational axes of the outer propellers 232, 242, 252 may be angled off-vertical in respective directions such that the orientation of the respective outer propellers 232, 242, 252 may be in the respective directions that may contribute to or supplement or boost or augment or add to the generation of counter clockwise yaw control moment of the aerial vehicle 200 in the hovering orientation.

Accordingly, the respective propeller rotational axes of the inner propellers 231, 241, 251 and the outer propellers 232, 242, 252 of each of the first set 230 of at least two propellers, the second set 240 of at least two propellers and the third set 250 of at least two propellers may be angled off-vertical in opposite directions such that the inner propellers 231, 241, 251 and the outer propellers 232, 242, 252 of each set 230, 240, 250 of at least two propellers may be orientated to cause opposing moments about the yaw axis of the aerial vehicle 200 in the hovering orientation.

According to various embodiments, in a hovering orientation of the aerial vehicle 200, when the respective propeller rotational axes of the inner propellers 231, 241, 251 and the outer propellers 232, 242, 252 of each of the first set 230 of at least two propellers, the second set 240 of at least two propellers and the third set 250 of at least two propellers are angled off-vertical with a same magnitude and generating a same amount of thrust, a residual yaw moment may arise due to the inner propeller 231 and the outer propeller 232 of the first set 230 of at least two propellers having different length of moment arm.

Accordingly, the tilt angles of the respective motors as well as the respective propeller rotational axes of the respective propellers 231, 232, 241, 242, 251, 252 may be configured such that they may not be the same, and the tilt angles may be determined from equilibrium of yaw moments. For example, suppose each of the propellers 241, 242, 251, 252 of the second set 240 of at least two propellers and the third set 250 of at least two propellers may be tilted in its respective sense by an amount θ. To avoid generating the residual yaw moments as described (with reference to the hovering orientation), the tilt angles of the propellers 231, 232 of the first set 230 of at least two propellers may either be zero or θ with a correction at either or both propellers 231, 232 by an incremental tilt δθ. An example is illustrated below with the correction applied at both propellers 231, 232. The tilt angle of the outer propeller 232 may be reduced by δθ and that for the inner propeller 231 may be increased by δθ. To determine δθ for zero residual yaw moment when the thrust of each propeller 231, 232 is T, using small angle assumptions, $$T(\theta - \delta\theta)(x_1 + \Delta x) - T(\theta + \delta\theta)(x_1 - \Delta x) = 0 \qquad (6)$$

$$\delta\theta = \frac{\Delta x}{x_1}\theta$$

According to various embodiments of the aerial vehicle 200, in the hovering orientation of the aerial vehicle 200, the aerial vehicle 200 may be configured to generate a control moment about a yaw axis of the aerial vehicle 200 such that the control moment may be free of either one or both of roll and pitch residual components.

According to various embodiments, the propeller rotational axis of the inner propeller 231 of the first set 230 of at least two propellers may be angled off-vertical with a first angular magnitude, the propeller rotational axis of the outer propeller 232 of the first set 230 of at least two propellers may be angled off-vertical with a second angular magnitude, and the respective propeller rotational axes of each of the propellers 241, 242, 251, 252 of each of the second set 240 of at least two propellers and the third set 250 of at least two propellers may be angled off-vertical with a same third angular magnitude.

According to various embodiments, the first angular magnitude may be more than the third angular magnitude and the second angular magnitude may be less than the third angular magnitude. According to various other embodiments, the first angular magnitude may be less than the third angular magnitude and the second angular magnitude may be more than the third angular magnitude.

According to various embodiments, the first angular magnitude, the second angular magnitude and the third angular magnitude may be equal.

Accordingly, apart from simple adapters to install the respective motors of the respective propellers 231, 232, 241, 242, 251, 252 at a respective tilt angles, the aerial vehicle 200 according to the various embodiments may achieve the boost in yaw control power without using additional motors, mechanisms, actuators or devices. Hence, various embodiments may provide a cost-effective technique for enhancing controllability, particularly when hovering in a cross-wind.

According to various embodiments, the respective propellers of the aerial vehicle 100 or the aerial vehicle 200 may be installed with variable pitch mechanisms to ensure efficient operation at both hover as well as airplane-mode flight. Accordingly, each propeller of each of the first set 130, 230 of at least two propellers, the second set 140, 240 of at least two propellers and the third set 150, 250 of at least two propellers may include a variable pitch propeller.

Figure 10:
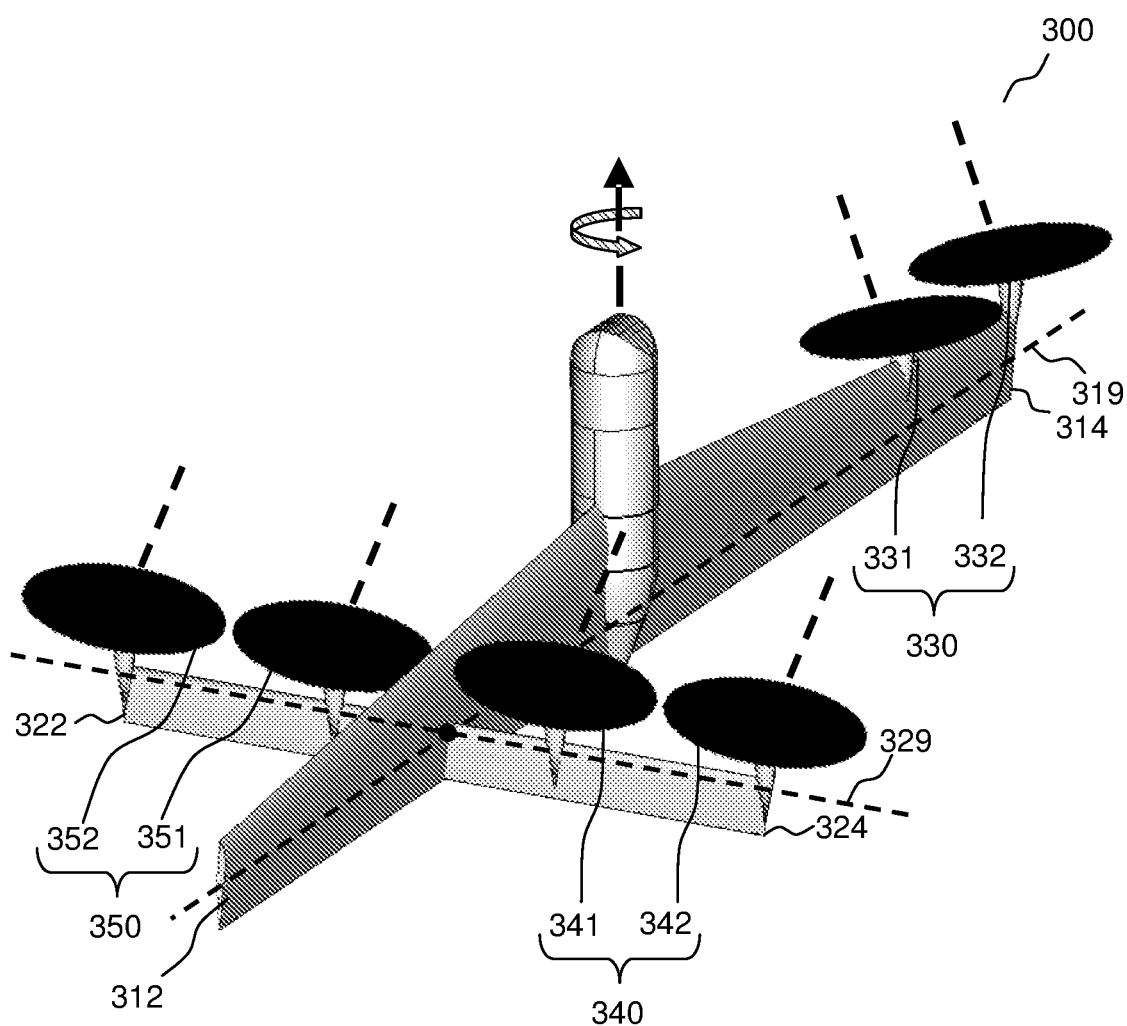
FIG. 10 shows an aerial vehicle according to various embodiments.

FIG. 10 shows an aerial vehicle 300 according to various embodiments. According to various embodiments, the respective propellers 331, 332, 341, 342, 351, 352 may be installed with helicopter-type swashplates, which may produce cyclic controls that tilt the respective axes of rotation of the respective propellers 331, 332, 341, 342, 351, 352. Further, the control power of helicopter-mode yaw (which is also airplane-mode roll) may be further increased, when the propellers are installed at positions with long moment arms. As shown in FIG. 10, the inner propeller 331 and the outer propeller 332 of the first set 330 of at least two propellers may be installed near the wingtip 314 of the first wing structure 310, and hence may have long moment arms. In addition, the second wing structure 320, along with its corresponding propellers 341, 342, 351, 352 of the second set 340 of at least two propellers and the third set 350 of at least two propellers, may be located as close to the opposite wingtip 312 as possible, subject to the equilibrium consideration as described previously in Eq. (1). According to various embodiments, the aerial vehicle 300, in a hovering orientation, may be operated to generate a control moment about a yaw axis of the aerial vehicle 300 such that the control moment may be free of either one or both of roll and pitch residual components.

Accordingly, the aerial vehicle 300 according to various embodiments may include a swashplate coupled to each propeller 331, 332, 341, 342, 351, 352 of each of the first set 330 of at least two propellers, the second set 340 of at least two propellers and the third set 350 of at least two propellers. Further, the aerial vehicle 300 or the controller of the aerial vehicle 300 may be configured to tilt respective swashplates of the respective propellers 331, 332, 341, 342, 351, 352 of each of the first set 330 of at least two propellers, the second set 340 of at least two propellers and the third set 350 of at least two propellers such that the respective propeller rotational axes of the respective propellers 331, 332, 341, 342, 351, 352 of each of the first set 330 of at least two propellers, the second set 340 of at least two propellers and the third set 350 of at least two propellers may be tilted to cause a moment about the yaw axis of the aerial vehicle in a same moment direction when in the hovering orientation. According to various embodiments, in the hovering orientation as shown in FIG. 10, the swashplates of the propellers 331, 332 of the first set 330 of at least two propellers may be tilted such that respective propeller rotational axes of the propellers 331, 332 of the first set 330 of at least two propellers may be angled off-vertical in respective planes, which are perpendicular to the transverse axis 319 of the first wing structure 310, in a same first direction. Further, the swashplates of the propellers 341, 342, 351, 352 of the second set 340 of at least two propellers and the third set 350 of at least two propellers may be tilted such that respective propeller rotational axes of the propellers 341, 342, 351, 352 may be angled off-vertical in a same second direction and in a plane perpendicular to the transverse axis 319 of the first wing structure 310. The plane containing all the rotational axes of the propellers 341, 342, 351, 352 may also contain the second wing structure 320. Accordingly, the plane containing all the rotational axes of the propellers 341, 342, 351, 352 may be parallel to the respective planes containing the respective rotational axes of the propellers 331, 332 of the first set 330 of at least two propellers. According to various embodiments, the second direction may be opposite the first direction. Accordingly, in this configuration, the aerial vehicle 300 may leverage on the long moment arm due to the wingspan of the first wing structure 310 to generate a control moment about the yaw axis of the aerial vehicle 300.

According to various other embodiments (not shown), the swashplates of the propellers 331, 332 of the first set 330 of at least two propellers may be tilted such that respective propeller rotational axes of the propellers 331, 332 of the first set 330 of at least two propellers may be angled off-vertical in respective planes, which are perpendicular to the transverse axis 319 of the first wing structure 310, in a same direction. Further, the swashplates of the propellers 341, 342, 351, 352 of the second set 340 of at least two propellers and the third set 350 of at least two propellers may be tilted such that respective propeller rotational axes of the propellers 341, 342, 351, 352 may be angled off-vertical in respective planes, which are perpendicular to the transverse axis 329 of the second wing structure 320. Accordingly, the respective planes containing the respective propeller rotational axes of the propellers 341, 342, 351, 352 of the second set 340 of at least two propellers and the third set 350 of at least two propellers may be perpendicular to the respective planes containing the respective propeller rotational axes of the propellers 331, 332 of the first set 330 of at least two propellers. Further, the propeller rotational axes of the propellers 341, 342 of the second set 340 of at least two propellers may be tilted in a direction opposite to the propeller rotational axes of the propellers 351, 352 of the third set 350 of at least two propellers.

According to various embodiments, the aerial vehicle 100 may be free of flight control surfaces. Accordingly, the aerial vehicle 100 may be free of one or more or a combination of ailerons, elevators, rudders, spoilers, flaps, slats, or air brakes. According to various embodiments, the first wing structure 110 and the second wing structure 140 of the aerial vehicle 100 may be free of flight control surfaces.

Figure 11:
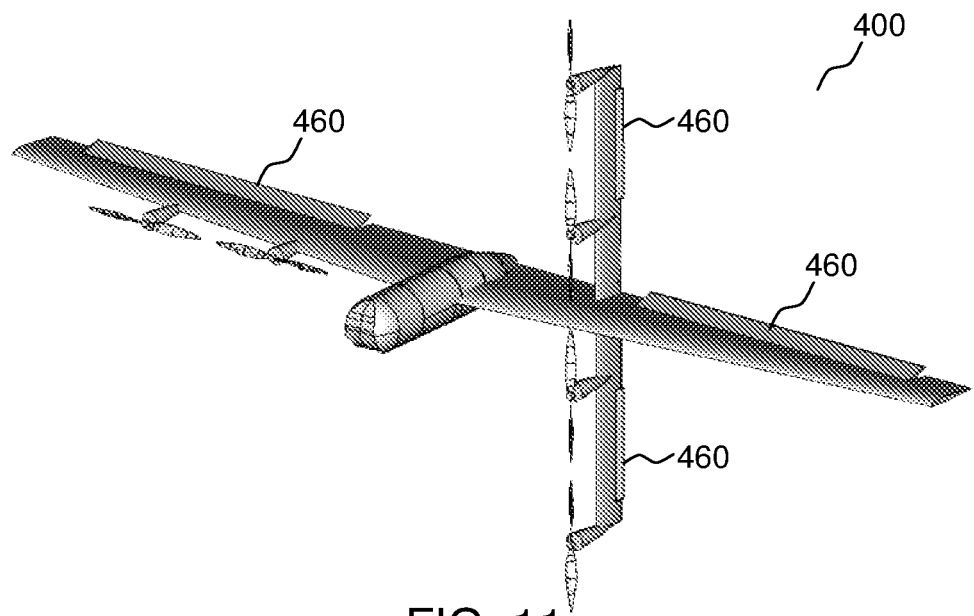
FIG. 11 shows an aerial vehicle according to various embodiments.

FIG. 11 shows an aerial vehicle 400 according to various other embodiments. According to various embodiments, the aerial vehicle may be installed with control surfaces 460 for additional means of flight control. Control surfaces 460 may include ailerons, elevators, rudders, spoilers, flaps, slats, or air brakes. As shown, control surfaces such as elevons may be provided on the first wing structure 410 (for both pitch and roll control in airplane-mode flight) and control surfaces such as rudders may be provided on the second wing structure 420 (for yaw control in airplane-mode flight). According to various embodiments, the aerial vehicle 400, in the hovering orientation, may be operated to generate a control moment about a yaw axis of the aerial vehicle 300 such that the control moment may be free of either one or both of roll and pitch residual components.

Figure 12:
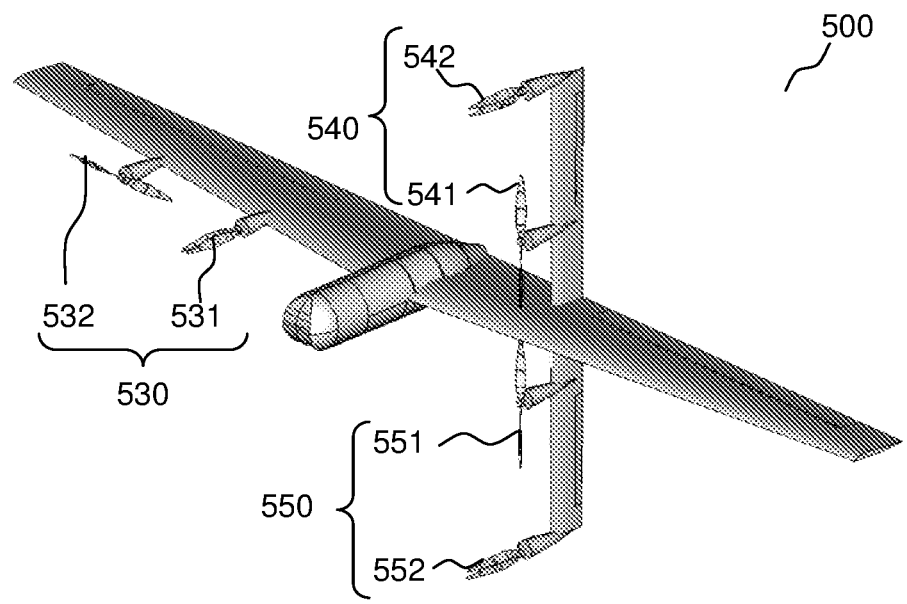
FIG. 12 shows an aerial vehicle according to various embodiments.

FIG. 12 shows an aerial vehicle 500 according to various embodiments. According to various embodiments, each propeller 531, 532, 541, 542, 551, 552 of each of the first set 530 of at least two propellers, the second set 540 of at least two propellers and the third set 550 of at least two propellers may be foldable. Accordingly, certain propellers may be folded for reduction of aerodynamic drag, subject to continued adequacy of propulsion and flight control. As shown in FIG. 12, the inner propeller 531 of the first set 530 of at least two propellers, the outer propeller 542 of the second set 540 of at least two propellers and the outer propeller 552 of the second set 550 of at least two propellers may be folded. Accordingly, in this manner, the aerial vehicle 500, in the hovering orientation, may generate a control moment about a yaw axis of the aerial vehicle 500 such that the control moment may be free of either one or both of roll and pitch residual components.

Figure 13:
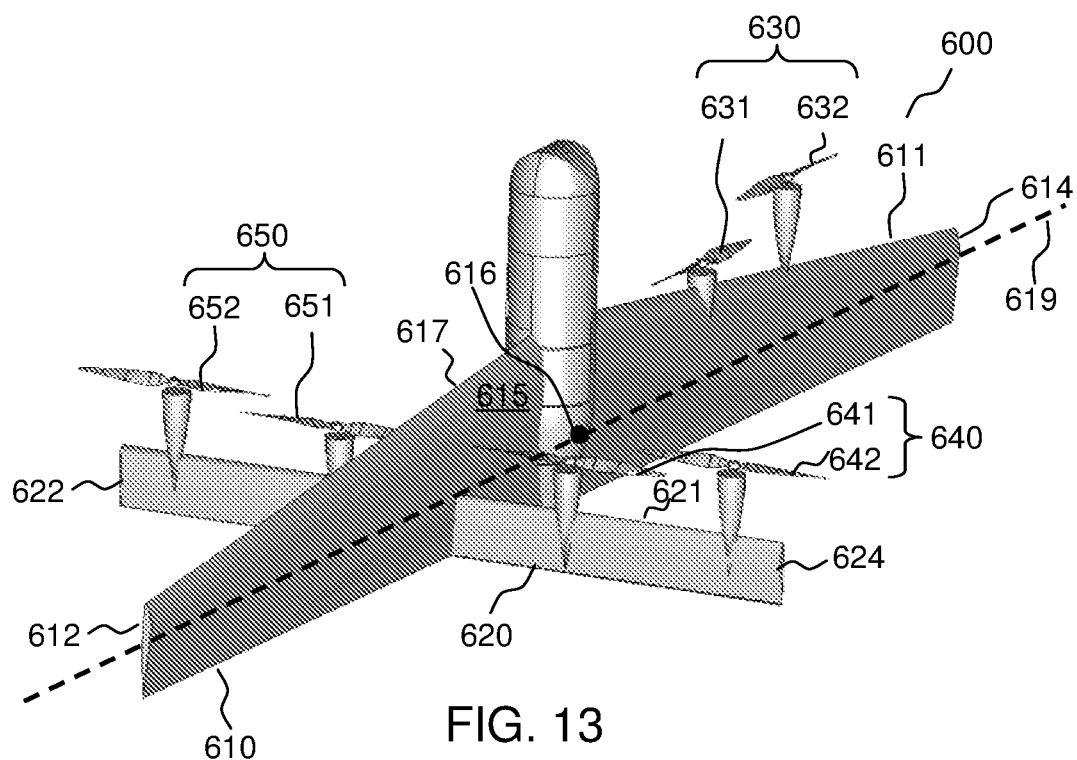
FIG. 13 shows an aerial vehicle in a vertical flight mode (or a helicopter-mode or hovering orientation) according to various embodiments.
Figure 14:
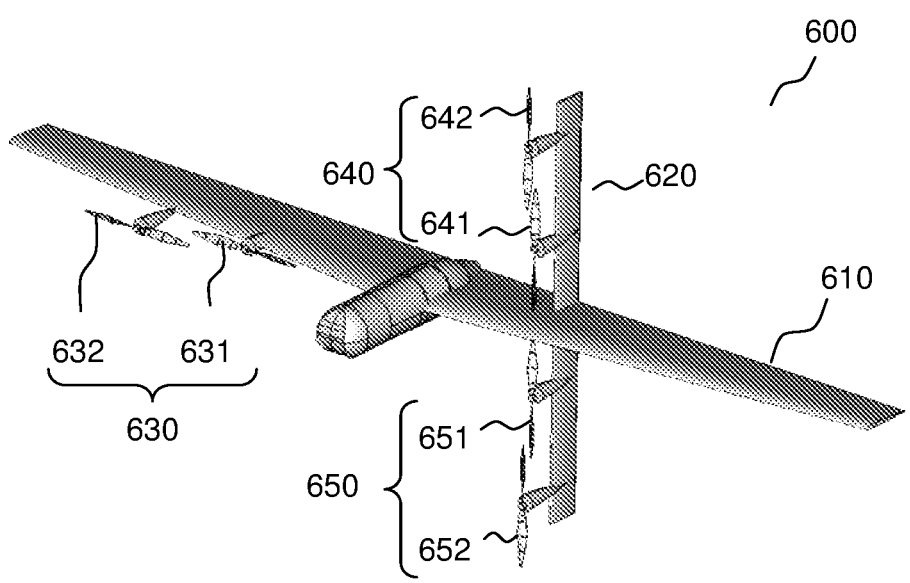
FIG. 14 shows the aerial vehicle of FIG. 13 in a horizontal flight mode (or an airplane-mode) according to various embodiments.

FIG. 13 and FIG. 14 show an aerial vehicle 600 in a vertical flight mode (or a helicopter-mode or a hovering orientation) and a horizontal flight mode (or an airplane-mode or an airplane orientation) respectively according to various embodiments. As shown, the aerial vehicle 600 may include a first wing structure 610 and a second wing structure 620 which intersects the first wing structure 610 perpendicularly at a position offset from a midpoint 616 of a transverse axis 619 of the first wing structure 610 in a direction towards a first wingtip 612 of the first wing structure 610. The aerial vehicle 600 may further include a first set 630 of at least two propellers 631, 632 with respective propeller rotational axes disposed along a portion of the first wing structure 610 extending between the midpoint 616 of the transverse axis 619 of the first wing structure 610 and a second wingtip 614 of the first wing structure 610. The aerial vehicle 600 may further include a second set 640 of at least two propellers 641, 642 with respective propeller rotational axes disposed along a first portion of the second wing structure 620 extending from a first surface 615 of the first wing structure 610. The aerial vehicle 600 may further include a third set 650 of at least two propellers 651, 652 with respective propeller rotational axes disposed along a second portion of the second wing structure 620 extending from a second surface 617 of the first wing structure 610.

According to various embodiments, the aerial vehicle 600 of FIG. 13 and FIG. 14 may differ from the aerial vehicle 100 of FIG. 1 and FIG. 2 in that the propellers 631, 632, 641, 642, 651, 652 of each set 630, 640, 650 of at least two propellers may be separately distributed and arranged in an overlapping and staggered configuration along respective portions of the respective wing structures. As shown, respective planes of rotation of the inner propeller 631 and the outer propeller 632 of the first set 630 of at least two propellers may overlap with each other and may be laterally spaced in a staggered arrangement. Accordingly, as shown in FIG. 13 and FIG. 14, in an airplane orientation of the aerial vehicle 600, the outer propeller 632 may be disposed laterally from the inner propeller 631 along the first wing structure 610 towards the second wingtip 614, and the outer propeller 632 may be ahead or in advance of or before the inner propeller 631 from the leading edge 611 of the first wing structure 610. According to various other embodiments (not shown), the inner propeller 631 may be ahead or in advance of or before the outer propeller 632 from the leading edge 611 of the first wing structure 610.

Further, as shown, respective planes of rotation of the inner propeller 641 and the outer propeller 642 of the second set 640 of at least two propellers may overlap with each other and may be laterally spaced in a staggered arrangement. Accordingly, in an airplane orientation of the aerial vehicle 600, the outer propeller 642 may be disposed laterally from the inner propeller 641 along the first portion of the second wing structure 620 towards the first wingtip 624 of the second wing structure 620, and the outer propeller 642 may be ahead or in advance of or before the inner propeller 641 from the leading edge 621 of the second wing structure 620. According to various other embodiments (not shown), the inner propeller 641 may be ahead or in advance of or before the outer propeller 642 from the leading edge 621 of the second wing structure 620.

Furthermore, as shown, respective planes of rotation of the inner propeller 651 and the outer propeller 652 of the third set 650 of at least two propellers may overlap with each other and may be laterally spaced in a staggered arrangement. Accordingly, in an airplane orientation of the aerial vehicle 600, the outer propeller 652 may be disposed laterally from the inner propeller 651 along the second portion of the second wing structure 620 towards the second wingtip 622 of the second wing structure 620, and the outer propeller 652 may be ahead or in advance of or before the inner propeller 651 from the leading edge 621 of the second wing structure 620. According to various other embodiments (not shown), the inner propeller 651 may be ahead or in advance of or before the outer propeller 652 from the leading edge 621 of the second wing structure 620.

According to various embodiments, there may be provided a method of assembling the aerial vehicle 100, 200, 300, 400, 500, 600 of the various embodiments. The method may include providing a first wing structure, providing a second wing structure which intersects the first wing structure perpendicularly at a position offset from a midpoint of the first wing structure towards a first wingtip of the first wing structure, providing a first set of at least two propellers with respective propeller rotational axes disposed side-by-side along a portion of the first wing structure extending between a midpoint of the first wing structure and a second wingtip of the first wing structure, providing a second set of at least two propellers with respective propeller rotational axes disposed side-by-side along a first portion of the second wing structure extending from a first side of the first wing structure, and providing a third set of at least two propellers with respective propeller rotational axes disposed side-by-side along a second portion of the second wing structure extending from a second side of the first wing structure. The method may further include configuring the respective aerial vehicle 100, 200, 300, 400, 500, 600 in accordance with the respective embodiments.

According to various embodiments, there may be provided a kit for assembling the aerial vehicle 100, 200, 300, 400, 500, 600 of the various embodiments. The kit may include a first wing structure and a second wing structure adapted to intersect the first wing structure perpendicularly at a position offset from a midpoint of the first wing structure towards a first wingtip of the first wing structure. The kit may further include a first set of at least two propellers adapted to be disposed with respective propeller rotational axes side-by-side along a portion of the first wing structure extending between a midpoint of the first wing structure and a second wingtip of the first wing structure. The kit may also include a second set of at least two propellers adapted to be disposed with respective propeller rotational axes side-by-side along a first portion of the second wing structure extending from a first side of the first wing structure. The kit may further include a third set of at least two propellers adapted to be disposed with respective propeller rotational axes side-by-side along a second portion of the second wing structure extending from a second side of the first wing structure. The respective parts of the kit may be configured to form the respective aerial vehicle 100, 200, 300, 400, 500, 600 in accordance with the respective embodiments.

According to various embodiments, there is provided an aerial vehicle including a first wing structure and a second wing structure which intersects the first wing structure perpendicularly at a position offset from a midpoint of a transverse axis of the first wing structure in a direction towards a first wingtip of the first wing structure. The aerial vehicle may further include a first set of at least two propellers with respective propeller rotational axes disposed side-by-side along a portion of the first wing structure extending between the midpoint of the transverse axis of the first wing structure and a second wingtip of the first wing structure. The aerial vehicle may further include a second set of at least two propellers with respective propeller rotational axes disposed side-by-side along a first portion of the second wing structure extending from a first surface of the first wing structure. The aerial vehicle may further include a third set of at least two propellers with respective propeller rotational axes disposed side-by-side along a second portion of the second wing structure extending from a second surface of the first wing structure.

According to various embodiments, in a hovering orientation of the aerial vehicle, the aerial vehicle may be configured to generate a control moment about a yaw axis of the aerial vehicle such that the control moment may be free of either one or both of roll and pitch residual components.

According to various embodiments, a mean distance of the propellers of the first set of at least two propellers from a lateral center of gravity of the first wing structure may be twice an offset distance of the second wing structure from the lateral center of gravity of the first wing structure.

According to various embodiments, a propeller of the second set of at least two propellers nearest to the first surface of the first wing structure and a propeller of the third set of at least two propellers nearest to the second surface of the first wing structure may be equidistant from the respective surfaces of the first wing structure.

According to various embodiments, a propeller of the second set of at least two propellers farthest away from the first surface of the first wing structure and a propeller of the third set of at least two propellers farthest away from the second surface of the first wing structure may be equidistant from the respective surfaces of the first wing structure.

According to various embodiments, an inner propeller of each of the first, second and third sets of at least two propellers may be rotating in a first direction, and an outer propeller of each of the first, second and third sets of at least two propellers may be rotating in a second direction. The second direction may be opposite of the first direction.

According to various embodiments, in an airplane orientation of the aerial vehicle when the aerial vehicle is operated to generate a roll moment via generating differential thrust between the inner propeller and the outer propeller of each of the first, second, and third sets of at least two propellers, the aerial vehicle may be configured to compensate a residual yaw moment produced.

According to various embodiments, the aerial vehicle may be configured to apply a corrective thrust adjustment to the propellers of each of the second and the third sets of at least two propellers, and to inversely apply the corrective thrust adjustment to the propellers of the first set of at least two propellers.

According to various embodiments, the aerial vehicle may be configured to apply a corrective thrust adjustment to the inner propeller and the outer propeller of the first set of at least two propellers.

According to various embodiments, the aerial vehicle may be further configured to compensate a residual thrust produced from the application of the corrective thrust adjustment to the inner and outer propellers of the first set of at least two propellers by applying a corrective throttle input to all the propellers of the aerial vehicle.

According to various embodiments, in an airplane orientation of the aerial vehicle, the aerial vehicle may be configured to generate a roll moment via generating a differential thrust between the inner propeller and the outer propeller of each of the second and third sets of at least two propellers, and ceasing the use of the first set of at least two propellers.

According to various embodiments, in the hovering orientation of the aerial vehicle, respective propeller rotational axes of the propellers of the first set of at least two propellers may be angled off-vertical in respective planes which may be perpendicular to the transverse axis of the first wing structure. Further, respective propeller rotational axes of the propellers of the second and third sets of at least two propellers may be angled off-vertical in respective planes which may be perpendicular to a transverse axis of the second wing structure.

According to various embodiments, respective propeller rotational axes of the inner propellers of the each of the first, second and third set of at least two propellers may be angled off-vertical in respective directions such that the respective inner propellers may be orientated to cause a moment about the yaw axis in a same first moment direction.

According to various embodiments, the respective propeller rotational axes of the outer propellers of each of the first, second and third set of at least two propellers may be angled off-vertical in respective directions such that the respective outer propellers may be orientated to cause a moment about the yaw axis in a same second moment direction. The second moment direction may be opposite the first moment direction.

According to various embodiments, the propeller rotational axis of the inner propeller of the first set of at least two propellers may be angled off-vertical with a first angular magnitude, the propeller rotational axis of the outer propeller of the first set of at least two propellers may be angled off-vertical with a second angular magnitude. Further, the respective propeller rotational axes of each of the inner and outer propellers of each of the second and third sets of at least two propellers may be angled off-vertical with a third angular magnitude.

According to various embodiments, the first angular magnitude may be more than the third angular magnitude and the second angular magnitude may be less than the third angular magnitude. According to various other embodiments, the first angular magnitude may be less than the third angular magnitude and the second angular magnitude may be more than the third angular magnitude.

According to various embodiments, each propeller of each of the first, second and third sets of at least two propellers may include a variable pitch propeller.

According to various embodiments, the aerial vehicle may further include a swashplate coupled to each propeller of each of the first, second and third sets of at least two propellers.

According to various embodiments, in a hovering orientation, the aerial vehicle may be configured to tilt respective swashplates of the respective propellers of each of the first, second and third set of at least two propellers such that the respective propeller rotational axes of the respective propellers of each of the first, second and third set of propellers may be tilted to cause a moment about the yaw axis of the aerial vehicle in a same moment direction.

According to various embodiments, the aerial vehicle may further include a flight control surface.

According to various embodiments, the aerial vehicle may be free of flight control surfaces.

According to various embodiments, each propeller of each of the first, second and third set of at least two propellers may be foldable.

According to various embodiments, the aerial vehicle may further include a fuselage blended with the first wing structure at the midpoint of the first wing structure.

According to various embodiments, there is provided a method of assembling an aerial vehicle. The method may include providing a first wing structure and providing a second wing structure which intersects the first wing structure perpendicularly at a position offset from a midpoint of the first wing structure towards a first wingtip of the first wing structure. The method may further include providing a first set of at least two propellers with respective propeller rotational axes disposed side-by-side along a portion of the first wing structure extending between a midpoint of the first wing structure and a second wingtip of the first wing structure. The method may further include providing a second set of at least two propellers with respective propeller rotational axes disposed side-by-side along a first portion of the second wing structure extending from a first surface of the first wing structure. The method may further include providing a third set of at least two propellers with respective propeller rotational axes disposed side-by-side along a second portion of the second wing structure extending from a second surface of the first wing structure.

According to various embodiments, the method may further include, configuring the aerial vehicle according to the various embodiments as described herein.

According to various embodiments, there is provided a kit for assembling an aerial vehicle. The kit may include a first wing structure and a second wing structure adapted to intersect the first wing structure perpendicularly at a position offset from a midpoint of the first wing structure towards a first wingtip of the first wing structure. The kit may further include a first set of at least two propellers adapted to be disposed with respective propeller rotational axes side-by-side along a portion of the first wing structure extending between a midpoint of the first wing structure and a second wingtip of the first wing structure. The kit may further include a second set of at least two propellers adapted to be disposed with respective propeller rotational axes side-by-side along a first portion of the second wing structure extending from a first surface of the first wing structure. The kit may further include a third set of at least two propellers adapted to be disposed with respective propeller rotational axes side-by-side along a second portion of the second wing structure extending from a second surface of the first wing structure.

According to various embodiments the respective parts of the kit may be configured to form the aerial vehicle according to the various embodiments as described herein.

Various embodiments have provided an aerial vehicle that have addressed some technical issues of a tailsitter aircraft relating to a high centre of gravity, and potentially high cost and complexity of developing the aerodynamic model for autonomous transition development. Various embodiments have provided an aerial vehicle that may retain the advantages of tailsitters, addresses their technical issues, leverages on recent technological developments in the stabilization of multi-rotor aircraft, and incorporates redundancy features. Furthermore, various embodiments have provided an aerial vehicle that may be mechanically simple and yet still provide enhanced control power when hovering in a crosswind.

Various embodiments have provided an aerial vehicle that may retain the advantages of tail-sitters and incorporate additional features which address the technical issues of tail-sitters. Various embodiments have provided an aerial vehicle that may have redundancy in case of power plant failure. Various embodiments have provided an aerial vehicle that may have enhanced control power, particularly for hovering in a crosswind and various embodiments may have achieved the above with mechanical simplicity.

Various embodiments have provided an aerial vehicle that may not require launch or recovery equipment, runways, or tilting mechanisms. Various embodiments have provided an aerial vehicle that may have a single set of flight controls, same controls concept in vertical and horizontal flight, and decoupled flight controls in roll, pitch and yaw, which represent distinct reductions in high complexity over tiltrotor and tilt-wing aircraft. Various embodiments have provided an aerial vehicle that may have inherently low centre of gravity position for stable ground handling, landing in a wind, or on rolling ship decks. This may address the susceptibility to toppling found in tail-sitters. Various embodiments have provided an aerial vehicle configured to accomplish transition using only the linear range of angle-of-attack. This may result in a distinct reduction in high cost, effort and complexity in development of autonomous transition. The size (and cost to generate it) of the aerodynamic database for adequate coverage of the transition envelope may be greatly reduced. This may also render unnecessary the characterization and analysis of the highly non-linear and complex aerodynamics which occur at the high angle-of-attack region, or the development of complex algorithms to achieve autonomous control over this region. Various embodiments have provided an aerial vehicle that may have options for high endurance power plants (e.g. fuel cells, heavy fuel engines etc.).

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An aerial vehicle comprising:
   a first wing structure;
   a second wing structure which intersects the first wing structure perpendicularly at a position offset from a midpoint of a transverse axis of the first wing structure in a direction towards a first wingtip of the first wing structure;
   a first set of at least two propellers with respective propeller rotational axes disposed side-by-side along a portion of the first wing structure extending between the midpoint of the transverse axis of the first wing structure and a second wingtip of the first wing structure;
   a second set of at least two propellers with respective propeller rotational axes disposed side-by-side along a first portion of the second wing structure extending from a first surface of the first wing structure; and
   a third set of at least two propellers with respective propeller rotational axes disposed side-by-side along a second portion of the second wing structure extending from a second surface of the first wing structure,
   wherein respective motors of respective propellers are fixedly installed at differential tilt such that the respective rotational axes are tilted for creating yaw, wherein
   the respective propeller rotational axes of inner propellers of the each of the first, second and third set of at least two propellers are angled off-vertical in respective directions such that the respective inner propellers are orientated to cause a moment about the yaw axis in a same first moment direction, or
   wherein the respective propeller rotational axes of outer propellers of each of the first, second and third set of at least two propellers are angled off-vertical in respective directions such that the respective outer propellers are orientated to cause a moment about the yaw axis in a same second moment direction, and wherein the second moment direction is opposite the first moment direction.

2. The aerial vehicle as claimed in claim 1, wherein, in a hovering orientation of the aerial vehicle, the aerial vehicle is configured to generate a control moment about a yaw axis of the aerial vehicle such that the control moment is free of either one or both of roll and pitch residual components.

3. The aerial vehicle as claimed in claim 1, wherein a mean distance of the propellers of the first set of at least two propellers from a lateral center of gravity of the first wing structure is twice an offset distance of the second wing structure from the lateral center of gravity of the first wing structure.

4. The aerial vehicle as claimed in claim 1, wherein a propeller of the second set of at least two propellers nearest to the first surface of the first wing structure and a propeller of the third set of at least two propellers nearest to the second surface of the first wing structure are equidistant from the respective surfaces of the first wing structure.

5. The aerial vehicle as claimed in claim 1, wherein a propeller of the second set of at least two propellers farthest away from the first surface of the first wing structure and a propeller of the third set of at least two propellers farthest away from the second surface of the first wing structure are equidistant from the respective surfaces of the first wing structure.

6. The aerial vehicle as claimed in claim 1, wherein an inner propeller of each of the first, second and third sets of at least two propellers is rotating in a first direction, and an outer propeller of each of the first, second and third sets of at least two propellers is rotating in a second direction, the second direction being opposite of the first direction.

7. The aerial vehicle as claimed in claim 6, wherein, in an airplane orientation of the aerial vehicle when the aerial vehicle is operated to generate a roll moment via generating differential thrust between the inner propeller and the outer propeller of each of the first, second, and third sets of at least two propellers, the aerial vehicle is configured to compensate a residual yaw moment produced.

8. The aerial vehicle as claimed in claim 7, wherein the aerial vehicle is configured to apply a corrective thrust adjustment to the propellers of each of the second and the third sets of at least two propellers, and to inversely apply the corrective thrust adjustment to the propellers of the first set of at least two propellers.

9. The aerial vehicle as claimed in claim 7, wherein the aerial vehicle is configured to apply a corrective thrust adjustment to the inner propeller and the outer propeller of the first set of at least two propellers, wherein the aerial vehicle may be configured to apply a corrective thrust adjustment to the inner propeller and the outer propeller of the first set of at least two propellers.

10. The aerial vehicle as claimed in claim 6, wherein, in an airplane orientation of the aerial vehicle, the aerial vehicle is configured to generate a roll moment via generating a differential thrust between the inner propeller and the outer propeller of each of the second and third sets of at least two propellers, and ceasing the use of the first set of at least two propellers.

11. The aerial vehicle as claimed in claim 6, wherein, in the hovering orientation of the aerial vehicle, the respective propeller rotational axes of the propellers of the first set of at least two propellers are angled off-vertical in respective planes which are perpendicular to the transverse axis of the first wing structure, and wherein the respective propeller rotational axes of the propellers of the second and third sets of at least two propellers are angled off-vertical in respective planes which are perpendicular to a transverse axis of the second wing structure.

12. The aerial vehicle as claimed in claim 1, wherein a propeller rotational axis of the inner propeller of the first set of at least two propellers is angled off-vertical with a first angular magnitude, a propeller rotational axis of the outer propeller of the first set of at least two propellers is angled off-vertical with a second angular magnitude, and wherein a respective propeller rotational axis of each of the inner and outer propellers of each of the second and third sets of at least two propellers is angled off-vertical with a third angular magnitude.

13. The aerial vehicle as claimed in claim 12, wherein the first angular magnitude is more than the third angular magnitude and the second angular magnitude is less than the third angular magnitude, or the first angular magnitude is less than the third angular magnitude and the second angular magnitude is more than the third angular magnitude.

14. The aerial vehicle as claimed in claim 1, wherein each propeller of each of the first, second and third sets of at least two propellers comprises a variable pitch propeller.

15. The aerial vehicle as claimed in claim 1, further comprising a flight control surface or wherein the aerial vehicle is free of flight control surfaces.

16. The aerial vehicle as claimed in claim 1, wherein each propeller of each of the first, second and third set of at least two propellers is foldable.

17. A method of assembling an aerial vehicle, the method comprising:
    providing a first wing structure;
    providing a second wing structure which intersects the first wing structure perpendicularly at a position offset from a midpoint of the first wing structure towards a first wingtip of the first wing structure;
    providing a first set of at least two propellers with respective propeller rotational axes disposed side-by-side along a portion of the first wing structure extending between the midpoint of the first wing structure and a second wingtip of the first wing structure;
    providing a second set of at least two propellers with respective propeller rotational axes disposed side-by-side along a first portion of the second wing structure extending from a first surface of the first wing structure; and
    providing a third set of at least two propellers with respective propeller rotational axes disposed side-by-side along a second portion of the second wing structure extending from a second surface of the first wing structure, wherein respective motors of respective propellers are fixedly installed at differential tilt such that the respective rotational axes are tilted for creating yaw, wherein
    the respective propeller rotational axes of inner propellers of the each of the first, second and third set of at least two propellers are angled off-vertical in respective directions such that the respective inner propellers are orientated to cause a moment about the yaw axis in a same first moment direction, or
    wherein the respective propeller rotational axes of outer propellers of each of the first, second and third set of at least two propellers are angled off-vertical in respective directions such that the respective outer propellers are orientated to cause a moment about the yaw axis in a same second moment direction, and wherein the second moment direction is opposite the first moment direction.

18. A kit for assembling an aerial vehicle, the kit comprising:
    a first wing structure;
    a second wing structure adapted to intersect the first wing structure perpendicularly at a position offset from a midpoint of the first wing structure towards a first wingtip of the first wing structure;
    a first set of at least two propellers adapted to be disposed with respective propeller rotational axes side-by-side along a portion of the first wing structure extending between the midpoint of the first wing structure and a second wingtip of the first wing structure;
    a second set of at least two propellers adapted to be disposed with respective propeller rotational axes side-by-side along a first portion of the second wing structure extending from a first surface of the first wing structure; and
    a third set of at least two propellers adapted to be disposed with respective propeller rotational axes side-by-side along a second portion of the second wing structure extending from a second surface of the first wing structure, wherein respective motors of respective propellers are configured to be fixedly installed at differential tilt such that the respective rotational axes are tilted for creating yaw, wherein the respective propeller rotational axes of inner propellers of the each of the first, second and third set of at least two propellers are angled off-vertical in respective directions such that the respective inner propellers are orientated to cause a moment about the yaw axis in a same first moment direction, or wherein the respective propeller rotational axes of outer propellers of each of the first, second and third set of at least two propellers are angled off-vertical in respective directions such that the respective outer propellers are orientated to cause a moment about the yaw axis in a same second moment direction, and wherein the second moment direction is opposite the first moment direction.

* * * * *